United States Patent
Nakatsugawa

[11] Patent Number: 6,167,061
[45] Date of Patent: Dec. 26, 2000

[54] TRANSMITTER, RECEIVER, COMMUNICATION APPARATUS, COMMUNICATION METHOD AND COMMUNICATION SYSTEM

[75] Inventor: Yoshinori Nakatsugawa, Susono, Japan

[73] Assignee: Yazaki Corporation, Tokyo, Japan

[21] Appl. No.: 08/975,103

[22] Filed: Nov. 20, 1997

[30] Foreign Application Priority Data

| Nov. 21, 1996 | [JP] | Japan | 8-310906 |
| Dec. 3, 1996 | [JP] | Japan | 8-323027 |
| Dec. 13, 1996 | [JP] | Japan | 8-334084 |
| Apr. 25, 1997 | [JP] | Japan | 9-109690 |
| Sep. 1, 1997 | [JP] | Japan | 9-236359 |

[51] Int. Cl.[7] .............. H04J 1/02; H04L 5/14; H04N 7/14
[52] U.S. Cl. .............. 370/480; 370/535; 455/3.1; 455/6.1
[58] Field of Search .............. 370/465, 480, 370/486, 503, 535, 916; 348/6, 12, 13, 17; 455/3.1, 5.1, 6.1

[56] References Cited

U.S. PATENT DOCUMENTS

| 5,038,402 | 8/1991 | Robbins | 455/3.1 |
| 5,293,633 | 3/1994 | Robbins | 455/3.1 |
| 5,548,582 | 8/1996 | Brajal et al. | 370/18 |
| 5,577,049 | 11/1996 | Ito | 370/112 |

FOREIGN PATENT DOCUMENTS

| 1-175452 | 7/1989 | Japan . |
| 2-43835 | 2/1990 | Japan . |
| 3-130638 | 12/1991 | Japan . |
| 5-300510 | 11/1993 | Japan . |
| 6-303602 | 10/1994 | Japan . |

*Primary Examiner*—Alpus H. Hsu
*Attorney, Agent, or Firm*—Oblon, Spivak, McClelland, Maier & Neustadt, P.C.

[57] ABSTRACT

Digital data which are transmitted from a plurality of external devices to execute data exchange at their natural communication speeds respectively via a data transfer line are multiplexed, and multiplexed digital data are transmitted to an external network. The multiplexed digital data received from the external network are distributed by inverse multiplexing, and distributed digital data are received by target external devices via the data transfer line. Accordingly, the digital data having different communication speeds mutually can be communicated via a common data transfer line.

22 Claims, 20 Drawing Sheets

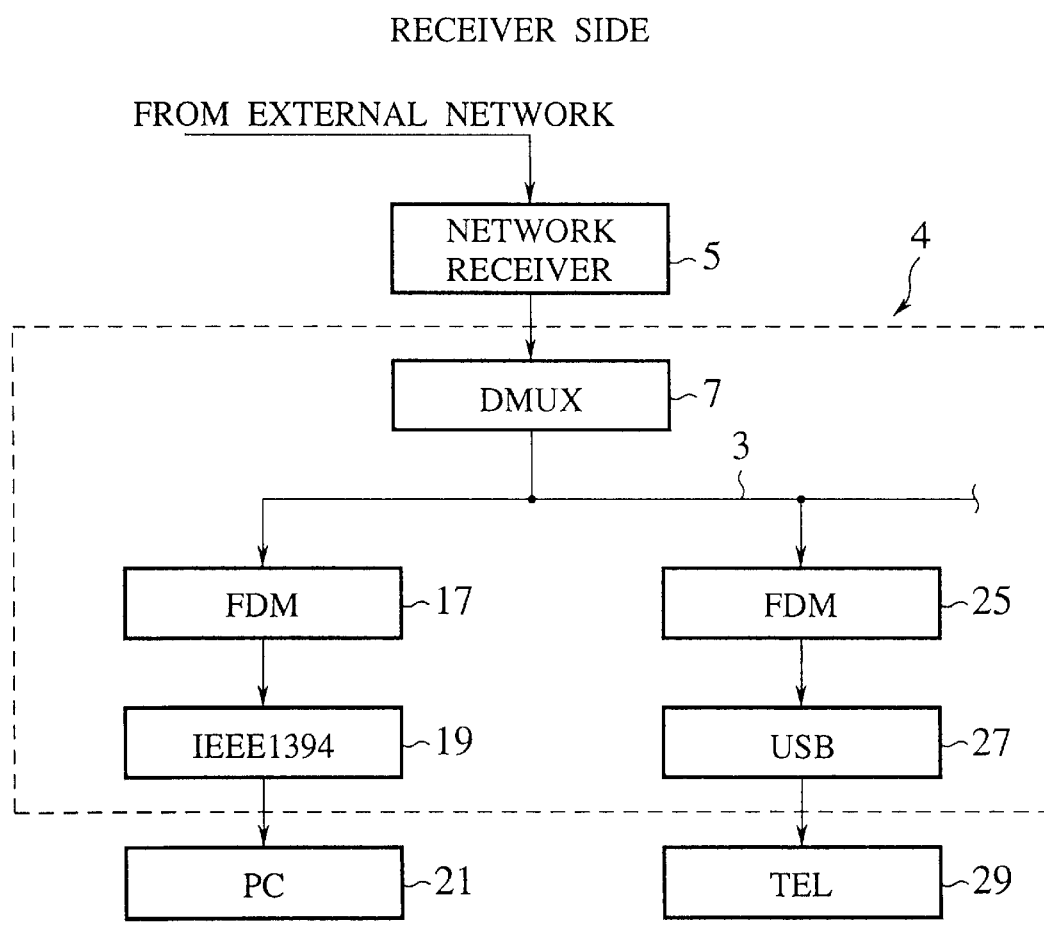

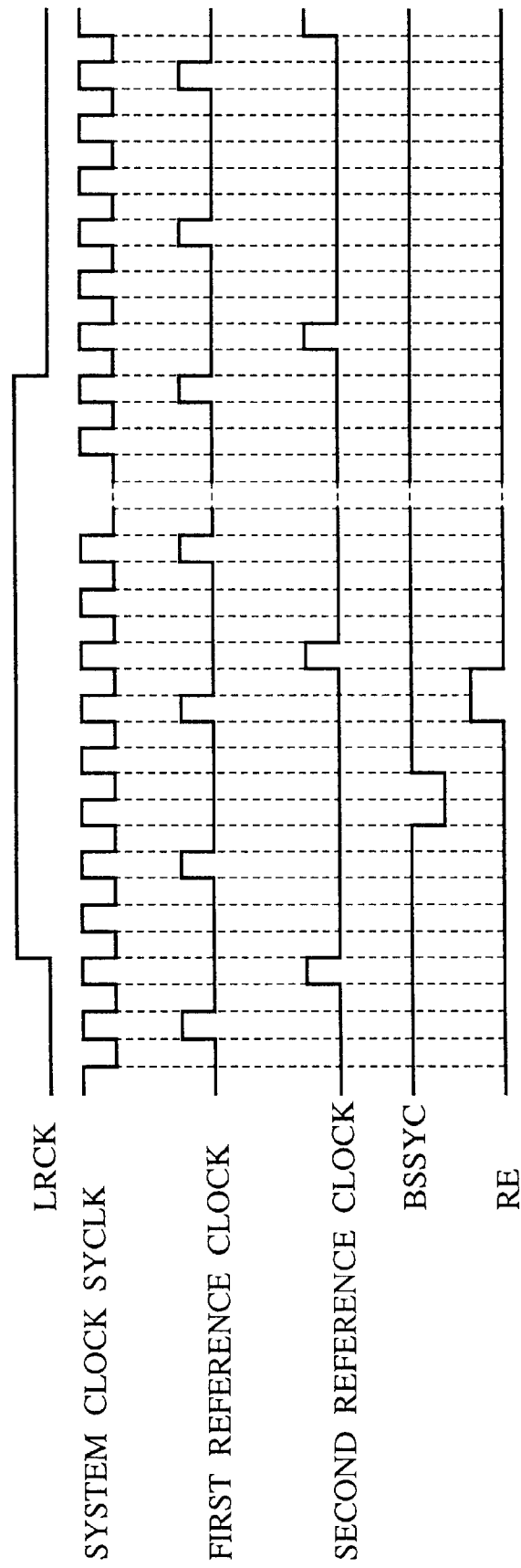

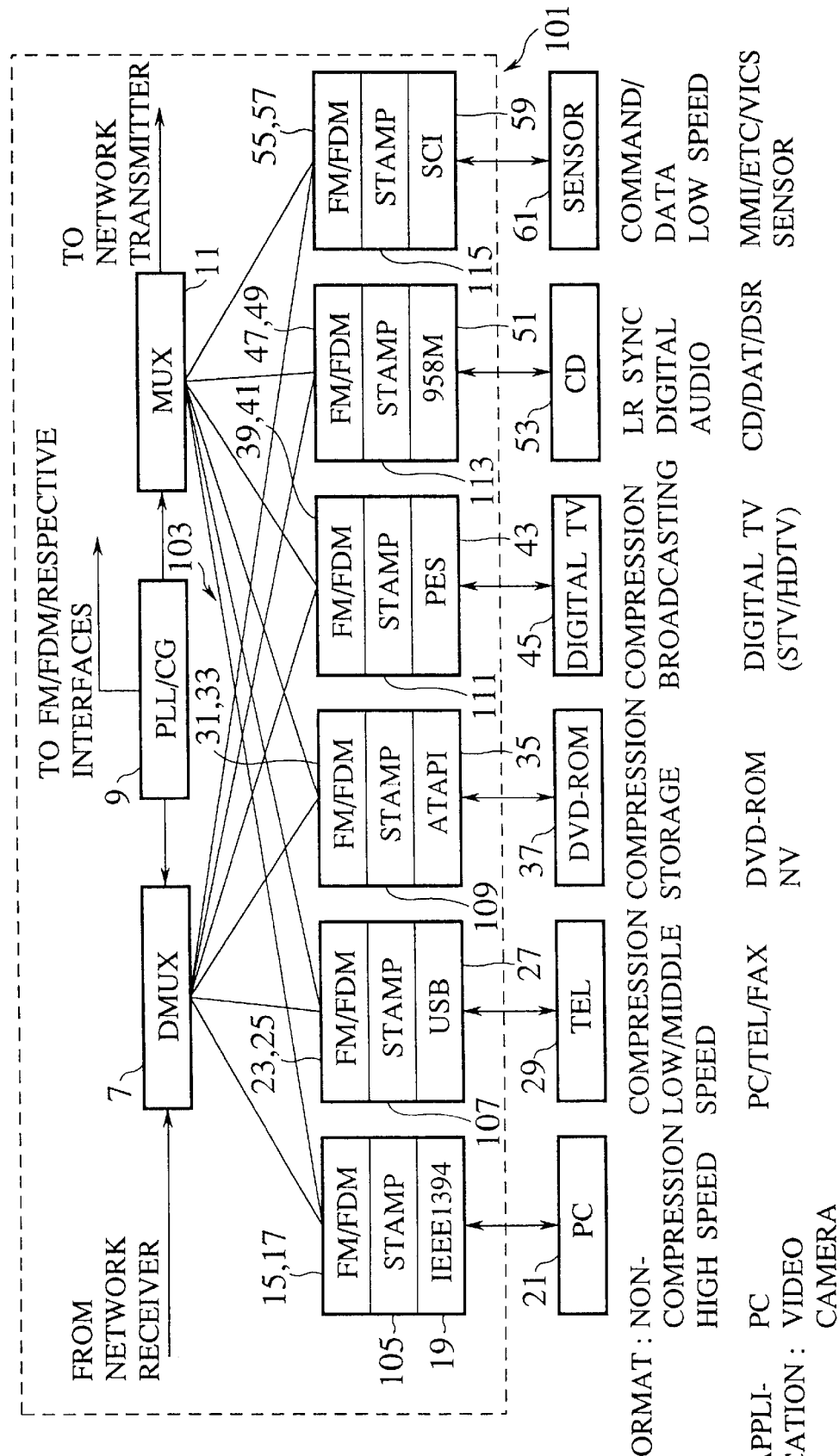

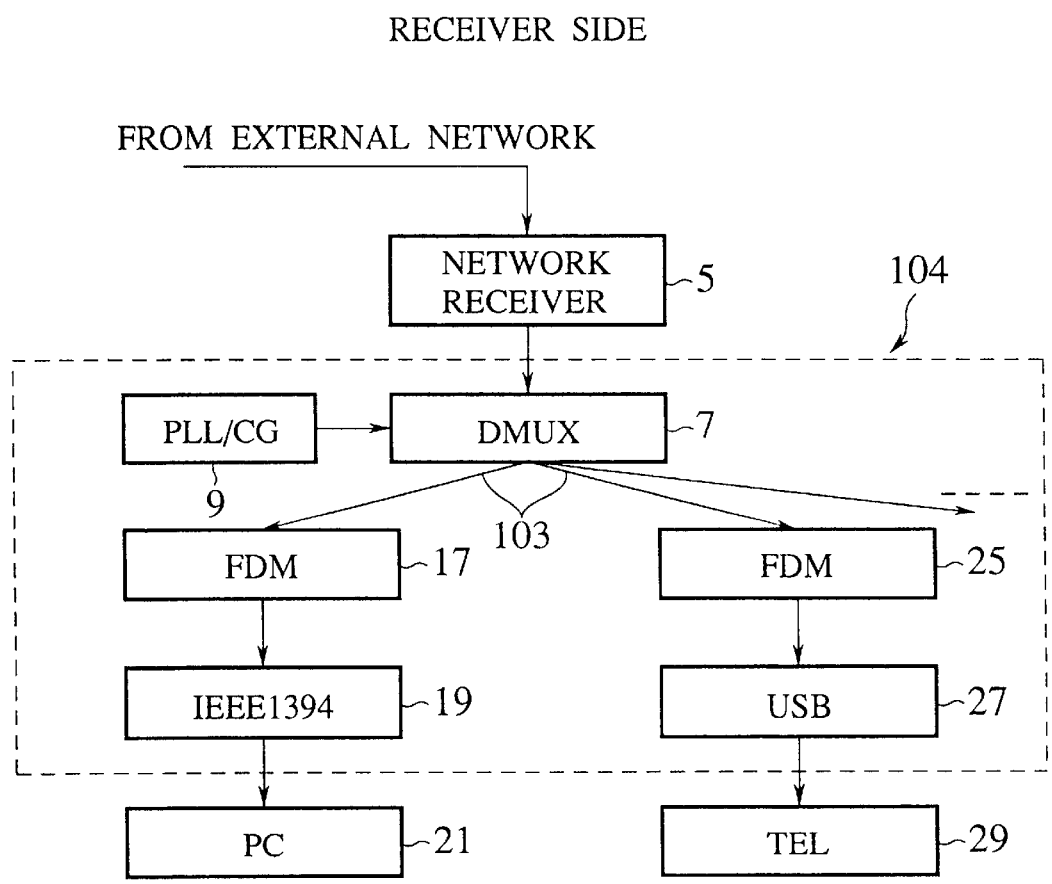

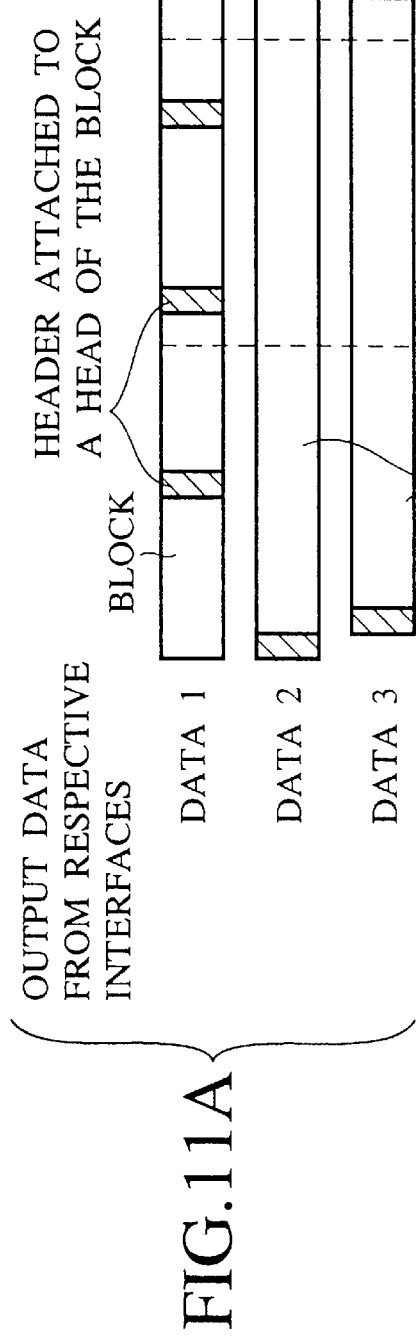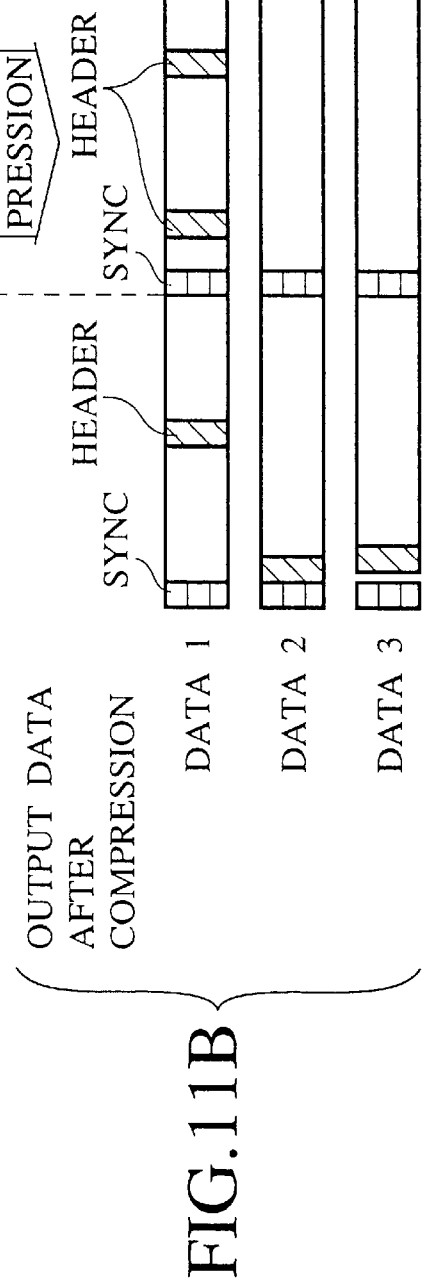

FIG.20

DEVICE CONNECTION INFORMATION

| RH NUMBER \ I/F NUMBER | 1 | 2 | 3 |
|---|---|---|---|
| 1 | TEL/FAX (IN) | TV (IN) | RADIO (IN) |
| 2 | NV (IN) (n TIME SPEED) | DVD/CD-ROM (IN) (k TIME SPEED) | CD DAT/MD (IN) |
| 3 | DSP1 (OUT) | CAN (IN) | Sensor 1 (IN) |
| 4 | VIDEO 1 (OUT) | VIDEO 2 (OUT) | VIDEO 3 (OUT) |
| 5 | SENSOR 2 (IN) | DSP 2 (OUT) | DSP 3 (OUT) |

FIG.22

CLOCK ALLOCATION TABLE

| | | EXTERNAL DEVICE | TRANSMITTER END | | RECEIVER END | |
|---|---|---|---|---|---|---|
| | | | RH NUMBER | I/F NUMBER | RH NUMBER | I/F NUMBER |
| CK1 (1/4) | | TEL/FAX | 1 | 1 | 5 | 3 |
| CK4 (1/8) | 1/64 | SENSOR 1/2 | 3/5 | 3/1 | 4 | 3 |
| | 3/32 | CAN | 3 | 2 | 4 | 3 |
| | 1/64 | COMMAND | MASTER | DEDICATED TERMINAL | SLAVE | DEDICATED TERMINAL |
| CK5 (1/32) | | CD | 2 | 3 | 3 | 1 |
| | | DAT/MD | 2 | 3 | 5 | 2 |
| | | RADIO | 1 | 3 | 5 | 3 |
| CK6 (1/32) | | NV | 2 | 1 | 4 | 3 |
| | | | | | 5 | 2 |
| CK9 (9/32) | | DVD-ROM | 2 | 2 | 3 | 1 |
| | | | | | 4 | 2 |
| CK10 (9/32) | | TV | 1 | 2 | 4 | 1 |
| | | | | | 5 | 3 |

TRANSMITTER, RECEIVER, COMMUNICATION APPARATUS, COMMUNICATION METHOD AND COMMUNICATION SYSTEM

BACKGROUND OF THE INVENTION

1. Field of the Invention

The present invention relates to a transmitter, a receiver, a communication apparatus, and a communication method capable of executing a centralization process of digital data by concentrating the digital data, which being transmitted from a plurality of external devices which enable execution of data exchange at their natural transmission speeds respectively or being transmitted from an external network, to a common data transfer line, a common multiplexer, or a common distributor, and also capable of implementing smooth two-way communications between the external network and the plurality of external devices or between the plurality of external devices.

The present invention also relates to a communication system constructed by connecting a plurality of communication apparatuses via a data transmission line to execute data exchange between the plurality of communication apparatuses and, more particularly, a communication system capable of implementing smooth two-way communications between the plurality of communication apparatuses.

The present invention also relates to a communication system constructed by connecting a plurality of communication apparatuses, to which one external device or more than two external devices being connected respectively, via a data transmission line to execute data exchange between any external devices, between any communication apparatuses, or between any external device and any communication apparatus and, more particularly, a communication method and a communication system capable of improving a communication efficiency remarkably by avoiding surely collision between communication data.

2. Description of the Prior Art

As protocols for communication devices or apparatuses commonly used in the prior art, D2B (Audio, video and audiovisual systems Domestic Digital Bus: CIE/IEC 1030) employed to transmit digital audio data, etc.; standard which conforms to a recommendation made by CCITT (International Telegraph and Telephone Consulting Committee) and is used to execute personal computer communication, etc.; USB (Universal Serial Bus) and IEEE1394 used to connect personal computer peripheral devices such as a keyboard, a CRT display, a mouse, a modem, and a printer to a personal computer main body; ATAPI (AT Attachment Packet Interface) used as an interface to connect devices such as a DVD (Digital Video Disc or Digital Versatile Disc)-ROM drive, or a music CD (Compact Disc) player; MPEG2 (Moving Picture Image Coding Experts Group Phase2: ISO/IEC13818) which is a full color moving picture compression scheme for a digital TV set, etc.; ATM (Asynchronous Transfer Mode) for a computer and a digital TV set; and the like, for example, have been known.

In recent, there has been caused a request to implement a centralization process by concentrating sound data or video data supplied from various vehicle-equipped devices such as a radio, a mobile telephone, a TV set, a CD player, a navigation system; speed data supplied from a speed sensor; moving orientation data supplied from a geomagnetism sensor; data of running conditions of the vehicle such as the distance data between own vehicle and the next vehicle ahead running in the same direction, and the like. The reason for such centralization process is that, if such centralization process can be executed by concentrating output data supplied from various vehicle-equipped devices, various sensors, and forth arranged in various locations of the vehicle, mutual output data can be commonly used by respective vehicle-equipped devices, and simultaneously necessary data can be communicated at once when an vehicle-vehicle communication to execute data communication between own vehicle and another vehicle and a road-vehicle communication to execute data communication between own vehicle and stations arranged along the running route should be conducted, so that convenience of the vehicle can be improved.

With the above mentioned protocols, communication speeds, data formats, etc. have been specified individually according to respective protocols without regard to compatibility or interchangeability of communications in the existing circumstances. Accordingly, in the event that data communication should be executed between the vehicle-equipped devices which have mutually different protocols respectively, for example, in general personal computers in which an interface and a communication control unit both being constructed to enable communications between object protocols are built in previously have been connected to respective vehicle-equipped devices and then personal computer communications through such personal computers have been carried out.

However, in such data communications between the vehicle-equipped devices, there have been many limitations to construct a system, e.g., the personal computers have to be connected to respective vehicle-equipped devices. Such many limitations have made it difficult to improve flexibility of the system and have become obstacles to construction of the communication system such as the vehicle-vehicle communication or the road-vehicle communication for which the centralization process of data is requested.

SUMMARY OF THE INVENTION

The present invention has been made in view of the above circumstances, and it is an object of the present invention to provide a transmitter, a receiver, a communication apparatus, and a communication method capable of executing a centralization process of digital data by concentrating the digital data, which being transmitted from a plurality of external devices which can execute data exchange at their natural transmission speeds respectively or being transmitted from an external network, to a common data transfer line, a common multiplexer, or a common distributor, and also capable of implementing smooth two-way communications between the external network and the plurality of external devices.

Further, it is another object of the present invention to provide a communication system capable of implementing smooth two-way communications between any communication apparatuses in the communication system which is constructed by connecting a plurality of communication apparatuses via a data transmission line.

Furthermore, it is still another object of the present invention to provide a communication method and a communication system capable of improving a communication efficiency remarkably by avoiding collision between communication data surely when data exchange are executed between any external devices, between any communication apparatuses, or between any external device and any communication apparatus in the communication system which is constructed by connecting a plurality of communication apparatuses, to which one external device or more than two external devices being connected respectively, via a data transmission line.

In order to achieve the above objects, there is provided a transmitter comprising a data transfer line for transferring digital data; a plurality of interfaces connected to a plurality of external devices in one-by-one correspondence, and constructed so as to fit to transmission speeds peculiar to the plurality of external devices respectively; a plurality of frequency modulators connected to the plurality of interfaces in one-by-one correspondence, for executing a frequency modulation to synchronize the digital data which have natural transmission speeds on respective interfaces with a predetermined system clock on the data transfer line, and then sending out the digital data which are subjected to the frequency modulation to the data transfer line respectively; a multiplexer for multiplexing the digital data which are transmitted from the plurality of frequency modulators via the data transfer line in synchronism with the predetermined system clock, and then transmitting multiplexed digital data to an external network; and a clock generator for generating reference clocks including the predetermined system clock, and then supplying the reference clocks to the plurality of frequency modulators and the multiplexer respectively.

According to the present invention, first, in a plurality of frequency modulators, the frequency modulation is executed to synchronize the digital data which have natural transmission speeds on respective interfaces with a predetermined system clock on the data transfer line, and then the frequency-modulated digital data are sent out to the data transfer line respectively. Then, the multiplexer multiplexes the digital data which are transmitted from the plurality of frequency modulators via the data transfer line in synchronism with the predetermined system clock, and then transmits the multiplexed digital data to the external network.

Therefore, a centralization process of digital data can be executed by concentrating the digital data, which being transmitted from a plurality of external devices which can execute data exchange at their natural transmission speeds respectively, onto the common data transfer line. The digital data can also be multiplexed and then the multiplexed digital data can be transmitted to the external network.

In order to achieve the above object, there is provided a receiver comprising a data transfer line for transferring digital data; a distributor for receiving multiplexed digital data transmitted from an external network, and then distributing the multiplexed digital data by inverse multiplexing insynchronism with a predetermined system clock on the data transfer line to send out to the data transfer line; a plurality of interfaces connected to a plurality of external devices in one-by-one correspondence, and constructed so as to fit to transmission speeds peculiar to the plurality of external devices respectively; a plurality of frequency demodulators for receiving digital data output from the distributor via the data transfer line, then executing a frequency demodulation to synchronize input data which have been synchronized with the predetermined system clock on the data transfer line with the natural transmission speeds on the plurality of interfaces respectively, and then sending out the digital data which are subjected to the frequency demodulation to the plurality of interfaces respectively; and a clock generator for generating reference clocks including the predetermined system clock, and then supplying the reference clocks to the distributor and the plurality of frequency demodulators respectively.

According to the present invention, first, in the distributor, multiplexed digital data transmitted from an external network are received, and then the multiplexed digital data are distributed by inverse multiplexing in synchronism with the predetermined system clock on the data transfer line to send out to the data transfer line. Then, the plurality of frequency demodulators receive the digital data output from the distributor via the data transfer line, then execute the frequency demodulation to synchronize input data which have been synchronized with the predetermined system clock on the data transfer line with the natural transmission speeds on the plurality of interfaces respectively, and then send out the digital data which are subjected to the frequency demodulation to the plurality of interfaces respectively. The plurality of external devices then receive the digital data via the plurality of interfaces.

Accordingly, since the multiplexed digital data transmitted from the external network are distributed to respective digital data by inverse multiplexing to send out to the data transfer line, the centralization process of digital data can be executed by concentrating the digital data, and also respective external devices can receive respective digital data by transforming the digital data into data formats having communication speeds peculiar to the plurality of interfaces.

In order to achieve the above object, there is provided a communication apparatus comprising a data transfer line for transferring digital data; a distributor for receiving multiplexed digital data transmitted from an external network, and then distributing the multiplexed digital data by inverse multiplexing in synchronism with a predetermined system clock on the data transfer line to send out to the data transfer line; a plurality of interfaces connected to a plurality of external devices in one-by-one correspondence, and constructed so as to fit to transmission speeds peculiar to the plurality of external devices respectively; a plurality of frequency modulators connected to the plurality of interfaces in one-by-one correspondence, for executing a frequency modulation to synchronize the digital data which have natural transmission speeds on respective interfaces with a predetermined system clock on the data transfer line, and then sending out the digital data which are subjected to the frequency modulation to the data transfer line respectively; a plurality of frequency demodulators for receiving the digital data output from the distributor via the data transfer line, then executing a frequency demodulation to synchronize input digital data which have been synchronized with the predetermined system clock on the data transfer line with the natural transmission speeds on the plurality of interfaces respectively, and then sending out the digital data which are subjected to the frequency demodulation to the plurality of interfaces respectively; a multiplexer for multiplexing the digital data which are transmitted from the plurality of frequency modulators via the data transfer line in synchronism with the predetermined system clock, and then transmitting multiplexed digital data to an external network; and a clock generator for generating reference clocks including the predetermined system clock, and then supplying the generated reference clocks to the distributor, the multiplexer, the plurality of frequency modulators, and the plurality of frequency demodulators respectively.

According to the present invention, when the digital data transmitted from the plurality of external devices respectively are transmitted to the external network via the data transfer line, in the plurality of frequency modulators, the frequency modulation is executed to synchronize the digital data which have natural transmission speeds on respective interfaces with the predetermined system clock on the data transfer line, and then the frequency-modulated digital data are sent out to the data transfer line respectively. Then, the multiplexer multiplexes the digital data which are transmitted via the data transfer line in synchronism with the predetermined system clock and then transmits the multiplexed digital data to the external network.

Meanwhile, when the multiplexed digital data transmitted from the external network are received by the plurality of external devices via the data transfer line respectively, in the distributor, the multiplexed digital data transmitted from the external network are received, and then the multiplexed digital data are distributed by inverse multiplexing in synchronism with the predetermined system clock on the data transfer line to send out to the data transfer line. Then, the plurality of frequency demodulators receive the digital data output from the distributor via the data transfer line, then execute the frequency demodulation to synchronize input digital data which have been synchronized with the predetermined system clock on the data transfer line with the natural transmission speeds on the plurality of interfaces respectively, and then sending out the frequency-demodulated digital data to the plurality of interfaces respectively. The digital data are then received by the plurality of external devices via the plurality of interfaces respectively.

Accordingly, the centralization process of digital data can be executed by concentrating the digital data which being transmitted from the plurality of external devices which can execute data exchange at their natural communication speeds or being transmitted from the external network, and also two-way communications between the external network and the plurality of external devices can be carried out smoothly.

In order to achieve the above object, there is provided a communication method for use in a communication system including a data transfer line for transferring digital data, and a plurality of interfaces connected to a plurality of external devices in one-by-one correspondence, and constructed so as to fit to transmission speeds peculiar to the plurality of external devices respectively, the communication method comprising the steps of: executing a frequency modulation to synchronize the digital data which are output from the plurality of external devices having natural transmission speeds on the plurality of interfaces respectively with a predetermined system clock on the data transfer line, and then sending out the digital data which are subjected to the frequency modulation to the data transfer line respectively; and multiplexing the digital data which are input via the data transfer line respectively in synchronism with the predetermined system clock, and then transmitting multiplexed digital data to an external network; whereby the digital data transmitted from the plurality of external devices respectively are sent to the external network via the data transfer line, and receiving multiplexed digital data transmitted from the external network, and then distributing the multiplexed digital data by inverse multiplexing in synchronism with the predetermined system clock to send out to the data transfer line; receiving the digital data transmitted via the data transfer line respectively, and then executing a frequency demodulation to synchronize the digital data which have been synchronized with the predetermined system clock with the natural transmission speeds on the plurality of interfaces respectively; and receiving the digital data which are subjected to the frequency demodulation by the plurality of external devices via the plurality of interfaces respectively; whereby the multiplexed digital data transmitted from the external network are received by the plurality of external devices via the data transfer line respectively.

According to the present invention, when the digital data transmitted from the plurality of external devices respectively are sent to the external network via the data transfer line, the frequency modulation is executed to synchronize the digital data which are output from the plurality of external devices having their natural transmission speeds on the plurality of interfaces respectively with the predetermined system clock on the data transfer line, then the frequency-modulated digital data are sent out to the data transfer line respectively, then the digital data input via the data transfer line respectively are multiplexed in synchronism with the predetermined system clock, and then the multiplexed digital data are transmitted to the external network. Meanwhile, when the multiplexed digital data transmitted from the external network are received by the plurality of external devices via the data transfer line respectively, the multiplexed digital data are distributed by inverse multiplexing in synchronism with the predetermined system clock to send out to the data transfer line, then the digital data transmitted via the data transfer line respectively are received, then the frequency demodulation is executed to synchronize the digital data which have been synchronized with the predetermined system clock with the natural transmission speeds on the plurality of interfaces respectively, and then the digital data which are subjected to the frequency demodulation are received by the plurality of external devices via the plurality of interfaces respectively.

Accordingly, like the above communication apparatus, the centralization process of digital data can be executed by concentrating the digital data which being transmitted from the plurality of external devices which can execute data exchange at their natural communication speeds or being transmitted from the external network, and also two-way communications between the external network and the plurality of external devices can be carried out smoothly.

In the preferred embodiment of the present invention, the digital data input via the data transfer line respectively are transformed into plural packets and then transmitted to the external network on a time-division multiplex basis.

In the preferred embodiment of the present invention, the transmitter further comprises a plurality of information adding means for adding header information including at least destination to the digital data which are divided into a predetermined proper unit with respect to the plurality of interfaces and then output.

According to this embodiment, the digital data can be firmly transmitted to the predetermined sender by referring to header information added by the information adding means.

In the preferred embodiment of the present invention, the receiver further comprises a plurality of header information deleting means for deleting header information from the digital data to which the header information including at least destination are added and which are sent out from the distributor via the data transfer line.

According to this embodiment, the plurality of external devices can receive raw data without including the extra information respectively by deleting header information by the header information deleting means.

In the preferred embodiment of the present invention, the communication apparatus further comprises a plurality of information adding means for adding header information including at least destination to the digital data which are divided into a predetermined proper unit with respect to the plurality of interfaces and then output; and a plurality of header information deleting means for deleting the header information from the digital data to which the header information including at least destination are added and which are sent out from the distributor via the data transfer line.

According to this embodiment, the digital data can be firmly transmitted to the predetermined sender by referring to header information added by the information adding means, and the plurality of external devices can receive raw data without including the extra information respectively by deleting header information by the header information deleting means.

In the preferred embodiment of the present invention, data exchanges are executed between senders and destinations based on device reference clocks peculiar to the plurality of external devices which are distributed at predetermined distribution ratios of the predetermined system clock.

According to this embodiment, since data exchange can be executed between the senders and the destinations based on the device reference clocks peculiar to the plurality of external devices which are distributed at the predetermined distribution ratios of the predetermined system clock, smooth two-way communications can be implemented between the external network and the plurality of external devices.

In order to achieve the above object, there is provided a transmitter comprising a data transfer line for transferring digital data; a plurality of interfaces connected to a plurality of external devices in one-by-one correspondence, and constructed so as to fit to transmission speeds peculiar to the plurality of external devices respectively; a plurality of frequency modulators connected to the plurality of external interfaces in one-by-one correspondence, for executing a frequency modulation to synchronize the digital data which have natural transmission speeds on respective interfaces with a predetermined system clock of multiplexer side, and then sending out the digital data which are subjected to the frequency modulation to the data transfer line respectively; a multiplexer for multiplexing the digital data which are transmitted from the plurality of frequency modulators via the data transfer line in synchronism with the predetermined system clock of multiplexer side, and then transmitting multiplexed digital data to an external network; and a clock generator for generating reference clocks including the predetermined system clock and then supplying the generated reference clocks to the plurality of frequency modulators and the multiplexer respectively.

According to the present invention, first, in the plurality of frequency modulators, the frequency modulation is executed to synchronize the digital data which are output from the plurality of external devices having their natural transmission speeds on the plurality of interfaces respectively with the predetermined system clock of multiplexer side on the data transfer line, then the frequency-modulated digital data are sent out to the data transfer line respectively. Then, the multiplexer multiplexes the digital data input via the data transfer line respectively in synchronism with the predetermined system clock of multiplexer side, and then transmits the multiplexed digital data to the external network.

Accordingly, the centralization process of digital data can be executed by concentrating the digital data which being transmitted from the plurality of external devices which can execute data exchange at their natural communication speeds onto the multiplexer, and also the digital data multiplexed by the multiplexer can be transmitted to the external network.

In order to achieve the above object, there is provided a receiver comprising a data transfer line for transferring digital data; a distributor for receiving multiplexed digital data transmitted from an external network, and then distributing the multiplexed digital data by inverse multiplexing in synchronism with a predetermined system clock of distributor side in the data transfer line to send out to the data transfer line; a plurality of interfaces connected to a plurality of external devices in one-by-one correspondence, and constructed so as to fit to transmission speeds peculiar to the plurality of external devices respectively; a plurality of frequency demodulators for receiving the digital data output from the distributor via the data transfer line, then executing a frequency demodulation to synchronize the digital data which have been synchronized with the predetermined system clock of distributor side with the natural transmission speeds on the plurality of interfaces respectively, and then sending out the digital data which are subjected to the frequency demodulation to the plurality of interfaces respectively; and a clock generator for generating reference clocks including the predetermined system clock of distributor side, and then supplying the reference clocks to the distributor and the plurality of frequency demodulators respectively.

According to the present invention, the distributor receives the multiplexed digital data transmitted from the external network, and then distributes the multiplexed digital data by inverse multiplexing in synchronism with the predetermined system clock on the data transfer line to send out to the data transfer line. Then, the plurality of frequency demodulators execute the frequency demodulation to synchronize input digital data which have been synchronized with the predetermined system clock of distributor side with the natural transmission speeds on the plurality of interfaces respectively, and then sends out the frequency-demodulated digital data to the plurality of interfaces respectively. The digital data are then received by the plurality of external devices via the plurality of interfaces respectively.

Accordingly, the centralization process of digital data can be executed by concentrating the multiplexed digital data which being transmitted from the external network onto the distributor, and also the digital data distributed by the distributor can be transformed into data formats having the communication speeds peculiar to the plurality of interfaces to enable reception by the external devices respectively.

In order to achieve the above object, there is provided a communication apparatus comprising a data transfer line for transferring digital data; a distributor for receiving multiplexed data transmitted from an external network, and then distributing multiplexed digital data by inverse multiplexing in synchronism with a predetermined system clock of distributor side to send out to the data transfer line; a plurality of interfaces connected to a plurality of external devices in one-by-one correspondence, and constructed so as to fit to transmission speeds peculiar to the plurality of external devices respectively; a plurality of frequency modulators connected to the plurality of interfaces in one-by-one correspondence, for executing a frequency modulation to synchronize the digital data which have natural transmission speeds on respective interfaces with a predetermined system clock of multiplexer side, and then sending out the digital data which are subjected to the frequency modulation to the data transfer line respectively; a plurality of frequency demodulators for receiving the digital data which are output from the distributor via the data transfer line, then executing a frequency demodulation to synchronize the digital data which have been synchronized with the predetermined system clock of distributor side with the natural transmission speeds on the plurality of interfaces respectively, and then sending out the digital data which are subjected to the frequency demodulation to the plurality of interfaces respectively; a multiplexer for multiplexing the digital data which are transmitted from the plurality of frequency modulators via the data transfer line in synchronism with the predetermined system clock of multiplexer side, and then transmitting multiplexed digital data to an external network; and a clock generator for generating reference clocks including the predetermined system clock of distributor side and the predetermined system clock of multiplexer side, and then supplying the reference clocks to the distributor, the multiplexer, the plurality of frequency modulators, and the plurality of frequency demodulators respectively.

According to the present invention, when the digital data transmitted from the plurality of external devices respectively are transmitted to the external network via the data transfer line, in the plurality of frequency modulators, the frequency modulation is executed to synchronize the digital data which have natural transmission speeds on respective interfaces with the predetermined system clock on the data transfer line, and then the frequency-modulated digital data are sent out to the data transfer line respectively. Then, the multiplexer multiplexes the digital data which are transmitted via the data transfer line in synchronism with the predetermined system clock and then transmits the multiplexed digital data to the external network.

Meanwhile, when the multiplexed digital data transmitted from the external network are received by the plurality of external devices via the data transfer line respectively, in the distributor, the multiplexed digital data transmitted from the external network are received, and then the multiplexed digital data are distributed by inverse multiplexing in synchronism with the predetermined system clock on the data transfer line to send out to the data transfer line. Then, the plurality of frequency demodulators receive the digital data output from the distributor via the data transfer line, then execute the frequency demodulation to synchronize input digital data which have been synchronized with the predetermined system clock on the data transfer line with the natural transmission speeds on the plurality of interfaces respectively, and then sending out the frequency-demodulated digital data to the plurality of interfaces respectively. The digital data are then received by the plurality of external devices via the plurality of interfaces respectively.

Accordingly, the centralization process of digital data can be executed by concentrating the digital data, which being transmitted from the plurality of external devices which can execute data exchange at their natural communication speeds or being transmitted from the external network, onto the multiplexer or the distributor, and also the two-way communications between the external network and the plurality of external devices can be carried out smoothly.

In order to achieve the above object, there is provided a communication method for use in a communication system including, a data transfer line for transferring digital data, and a plurality of interfaces connected to a plurality of external devices in one-by-one correspondence, and constructed so as to fit to transmission speeds peculiar to the plurality of external devices respectively, the communication method comprising the steps of: executing a frequency modulation to synchronize the digital data which are output from the plurality of external devices having the natural transmission speeds on the plurality of interfaces respectively with a predetermined system clock of multiplexer side, and then sending out the digital data which are subjected to the frequency modulation to the data transfer line respectively; and multiplexing the digital data which are input via the data transfer line respectively in synchronism with the predetermined system clock of multiplexer side, and then transmitting multiplexed digital data to an external network; whereby the digital data which are transmitted from the plurality of external devices respectively are sent to the external network via the data transfer line, and receiving the multiplexed digital data transmitted from the external network, and then distributing the multiplexed digital data by inverse multiplexing in synchronism with the predetermined system clock of distributor side to send out to the data transfer line; receiving the digital data transmitted via the data transfer line respectively, and then executing a frequency demodulation to synchronize the digital data which have been synchronized with the predetermined system clock of distributor side with the natural transmission speeds on the plurality of interfaces respectively; and receiving the digital data which are subjected to the frequency demodulation by the plurality of external devices via the plurality of interfaces respectively; whereby the multiplexed digital data which are transmitted from the external network are received by the plurality of external devices via the data transfer line respectively.

According to the present invention, when the digital data transmitted from the plurality of external devices respectively are transmitted to the external network via the data transfer line, the frequency modulation is executed to synchronize the digital data which are output from the plurality of external devices having their natural transmission speeds on the plurality of interfaces respectively with the predetermined system clock of multiplexer side, and then the frequency-modulated digital data are sent out to the data transfer line respectively. Then, the digital data which are transmitted via the data transfer line respectively are multiplexed in synchronism with the predetermined system clock of multiplexer side and then the multiplexed digital data are transmitted to the external network. Meanwhile, when the multiplexed digital data transmitted from the external network are received by the plurality of external devices via the data transfer line respectively, the multiplexed digital data transmitted from the external network are received, and then the multiplexed digital data are distributed by inverse multiplexing in synchronism with the predetermined system clock of distributor side to send out to the data transfer line. Then, the frequency demodulation is executed to synchronize input digital data which have been synchronized with the predetermined system clock of distributor side with the transmission speeds peculiar to the plurality of interfaces respectively, and then the frequency-demodulated digital data are received by the plurality of external devices via the plurality of interfaces respectively.

Accordingly, the centralization process of digital data can be executed by concentrating the digital data, which being transmitted from the plurality of external devices which can execute data exchange at their natural communication speeds or being transmitted from the external network, onto the multiplexing or distributing function portion, and also the two-way communications between the external network and the plurality of external devices can be carried out smoothly.

In the preferred embodiment of the present invention, the digital data which are input via the data transfer line respectively are transformed into plural packets and then transmitted to the external network on a time-division multiplex basis.

In the preferred embodiment of the present invention, data exchanges are executed between senders and destinations based on device reference clocks peculiar to the plurality of external devices which are distributed at predetermined distribution ratios of the predetermined system clock.

According to this embodiment, since data exchange can be executed between the senders and the destinations based on the device reference clocks peculiar to the plurality of external devices which are distributed at the predetermined distribution ratios of the predetermined system clock, smooth two-way communications can be implemented between the external network and the plurality of external devices.

In the preferred embodiment of the present invention, the multiplexer side system clock and the distributor side system clock are set mutually at a common frequency.

In the preferred embodiment of the present invention, the transmitter further comprises a plurality of information adding means for adding header information including at least destination to the digital data which are divided into a predetermined proper unit with respect to the plurality of interfaces and then output.

According to this embodiment, the digital data can be firmly transmitted to the predetermined sender by referring to header information added by the information adding means.

In the preferred embodiment of the present invention, the receiver further comprises a plurality of header information deleting means for deleting header information from the digital data to which the header information including at least destination are added and which are sent out from the distributor via the data transfer line.

According to this embodiment, the plurality of external devices can receive raw data without including the extra information respectively by deleting header information by the header information deleting means.

In the preferred embodiment of the present invention, the communication apparatus further comprises a plurality of information adding means for adding header information including at least destination to the digital data which are divided into a predetermined proper unit with respect to the plurality of interfaces and then output; and a plurality of header information deleting means for deleting the header information from the digital data to which the header information including at least the destination are added and which are sent out from the distributor via the data transfer line.

According to this embodiment, the digital data can be firmly transmitted to the predetermined sender by referring to header information added by the information adding means, and the plurality of external devices can receive raw data without including the extra information respectively by deleting header information by the header information deleting means.

In order to achieve the above object, there is provided a communication method for use in a communication system including a data transfer line for transferring digital data, and a plurality of interfaces connected to a plurality of external devices in one-by-one correspondence, and constructed so as to fit to transmission speeds peculiar to the plurality of external devices respectively, the communication method comprising the steps of: adding header information including at least destination to the digital data which have natural communication speeds on the plurality of interfaces and are divided into a predetermined proper unit of the plurality of interfaces and then output; executing a frequency modulation to synchronize the digital data to which the header information are added with a predetermined system clock of multiplexer side, and then sending out the digital data which are subjected to the frequency modulation to the data transfer line respectively; and multiplexing the digital data which are input via the data transfer line respectively in synchronism with the predetermined system clock of multiplexer side, and then transmitting multiplexed digital data to an external network; whereby the digital data which are transmitted from the plurality of external devices respectively are sent to the external network via the data transfer line, and receiving the multiplexed digital data transmitted from the external network, and then distributing the multiplexed digital data by inverse multiplexing in synchronism with a predetermined system clock of distributor side to send out to the data transfer line; receiving the digital data which are transmitted via the data transfer line respectively, and then executing a frequency demodulation to synchronize the digital data which have been synchronized with the predetermined system clock of distributor side with the natural transmission speeds on the plurality of interfaces respectively; and receiving the digital data which are subjected to the frequency demodulation by the plurality of external devices via the plurality of interfaces respectively; whereby the multiplexed digital data which are transmitted from the external network are received by the plurality of external devices via the data transfer line respectively.

According to the present invention, when the digital data transmitted from the plurality of external devices respectively are transmitted to the external network via the data transfer line, header information including at least destination are added respectively to the digital data which have their natural communication speeds on the plurality of interfaces and are divided into predetermined proper units on the plurality of interfaces respectively and then output, then the frequency modulation is executed to synchronize the digital data to which the header information are added respectively with the predetermined system clock of multiplexer side, and then the frequency-modulated digital data are sent out to the data transfer line respectively. Then, the digital data which are transmitted via the data transfer line respectively are multiplexed in synchronism with the predetermined system clock of multiplexer side and then the multiplexed digital data are transmitted to the external network.

In order to achieve the above object, there is provided a communication method for use in a communication system including a data transfer line for transferring digital data, and a plurality of interfaces connected to a plurality of external devices in one-by-one correspondence, and constructed so as to fit to transmission speeds peculiar to the plurality of external devices respectively, the communication method comprising the steps of: executing a frequency modulation to synchronize the digital data which have natural communication speeds on the plurality of interfaces with a predetermined system clock of multiplexer side; adding header information including at least destination to the digital data which are subjected to the frequency modulation and are divided into a predetermined proper unit of the plurality of interfaces and then output respectively, and then sending out the digital data to which the header information are added to the data transfer line respectively; and multiplexing the digital data which are input via the data transfer line respectively in synchronism with the predetermined system clock of multiplexer side, and then transmitting multiplexed digital data to an external network; whereby the digital data which are transmitted from the plurality of external devices respectively are sent to the external network via the data transfer line, and receiving the multiplexed digital data transmitted from the external network, and then distributing the multiplexed digital data by inverse multiplexing in synchronism with a predetermined system clock of distributor side to send out to the data transfer line; receiving the digital data which are transmitted via the data transfer line respectively, and then executing a frequency demodulation to synchronize the digital data which have been synchronized with the predetermined system clock of distributor side with the natural transmission speeds on the plurality of interfaces respectively; and receiving the digital data which are subjected to the frequency demodulation by the plurality of external devices via the plurality of interfaces respectively; whereby the multiplexed digital data which are transmitted from the external network are received by the plurality of external devices via the data transfer line respectively.

According to the present invention, when the digital data transmitted from the plurality of external devices respectively are transmitted to the external network via the data transfer line, the frequency modulation is executed to synchronize the digital data which have their natural transmission speeds on the plurality of interfaces respectively with the predetermined system clock of multiplexer side, then the header information including at least destination are added respectively to the digital data which have been subjected to the frequency modulation and divided into predetermined proper units on the plurality of interfaces and then output respectively, and then the digital data to which the header information are added are sent out to the data transfer line respectively. Then, the digital data which are received via the data transfer line respectively are multiplexed in synchronism with the predetermined system clock of multiplexer side and then the multiplexed digital data are transmitted to the external network.

In order to achieve the above object, there is provided, in a communication system constructed by connecting a plurality of communication apparatuses via a data transmission line to execute data exchange between any communication apparatuses, the plurality of communication apparatuses are constructed so as to access the data transmission line at timing periods peculiar to respective communication apparatuses in synchronism with a common system clock among respective communication apparatuses, and the timing periods peculiar to respective communication apparatuses are set to be shifted mutually such that accesses to the data transmission line are not simultaneously generated from the plurality of communication apparatuses.

According to the present invention, the plurality of communication apparatuses are constructed so as to access the data transmission line at their timing periods peculiar to respective communication apparatuses in synchronism with the common system clock among the plurality of communication apparatuses and also the timing periods peculiar to respective communication apparatuses are set to be shifted mutually such that access to the data transmission line are not simultaneously generated from the plurality of communication apparatuses. Therefore, the plurality of communication apparatuses can access the data transmission line in parallel respectively with avoiding collision of data. As a result, smooth two-way communications between any communication apparatuses can be realized while assuring excellent real-time facility.

In order to achieve the above object, there is provided, in a communication system constructed by connecting a plurality of communication apparatuses via a star configuration data transmission line which is arranged around one centralized controller to execute data exchange between any communication apparatuses, the plurality of communication apparatuses are constructed so as to access the centralized controller at timing periods peculiar to respective communication apparatuses in synchronism with a common system clock among respective communication apparatuses, and the timing periods peculiar to the communication apparatuses are set to be shifted mutually such that accesses to the centralized controller are not simultaneously generated from the plurality of communication apparatuses.

According to the present invention, the plurality of communication apparatuses are constructed so as to access the centralized controller at their timing periods peculiar to respective communication apparatuses in synchronism with the common system clock among the plurality of communication apparatuses and in addition the timing periods peculiar to respective communication apparatuses are set to be shifted mutually such that access to the centralized controller are not simultaneously generated from the plurality of communication apparatuses. Hence, the plurality of communication apparatuses can access the centralized controller in parallel respectively with avoiding collision of data. As a result, smooth two-way communications between any communication apparatuses and the centralized controller can be realized while assuring excellent real-time facility and in addition the communication system having a simple configuration to which the centralized controller and the buffer memory for storing overflow data temporarily are not required can be achieved.

In order to achieve the above object, there is provided, in a communication method for use in a communication system which is constructed by connecting a plurality of communication apparatuses via a data transmission line to execute data exchange between any communication apparatuses, the plurality of communication apparatuses are constructed so as to access the data transmission line in synchronism with predetermined timing clocks which are set to respective communication apparatuses in synchronism with a common system clock among respective communication apparatuses, when data exchange is executed between a sender communication apparatus and a destination communication apparatus among the plurality of communication apparatuses, communication channels can be established by producing the predetermined timing clocks which are commonly used between the sender communication apparatus and the destination communication apparatus, the sender communication apparatus can execute data transmission in synchronism with the predetermined timing clock, and the destination communication apparatus can receive data in synchronism with the predetermined timing clock.

According to the present invention, when data exchange is to be executed between the sender communication apparatus and the destination communication apparatus, first of all, a communication route is generated by establishing a predetermined timing clock used commonly between both communication apparatuses, then the sender communication apparatus executes data transmission in synchronism with a predetermined timing clock while the destination communication apparatus executes data reception in synchronism with the predetermined timing clock. Accordingly, the plurality of communication apparatuses can access the data transmission lines in parallel respectively with avoiding collision of data. As a result, smooth two-way communications between any communication apparatuses can be realized while assuring excellent real-time facility.

In order to achieve the above object, there is provided, in a communication method for use in a communication system which is constructed by connecting a plurality of communication apparatuses, to which one external device or two or more external devices are connected respectively, via a data transmission line to execute data exchange between any external devices, between any communication apparatuses, or between any external device and any communication apparatus, at least one of communication apparatuses out of the plurality of communication apparatuses can generate clock allocation information in connection with distribution ratios of a common system clock among the plurality of communication apparatuses to various external devices respectively based on all device connection information including type of the external devices connected to the plurality of communication apparatuses constituting the communication system, and can transmit the clock allocation information to overall communication apparatuses including its own communication apparatus, the plurality of communication apparatuses including the at least of communication apparatus execute data can exchange between any sender and any destination based on device reference clocks peculiar to various external devices and distributed at distribution ratios of the system clock according to the clock allocation information, and a plurality of device reference clocks peculiar to the various external devices are set such that respective rising times of their pulses are shifted mutually with regard to a fact that pulse rising timings as data communication timings of the various external devices are not generated simultaneously between the external devices.

According to the present invention, at least one of the communication apparatuses out of the plurality of communication apparatuses generates the clock allocation information concerning the distribution ratios of the system clock common to the plurality of communication apparatuses for respective external devices based on the all device connection information, and transmits the generated clock allocation information to all communication apparatuses including own communication apparatus. In response to the clock allocation information, the plurality of communication apparatuses including own communication apparatus execute data exchange between any sender and any destination based on the device reference clocks which are distributed at distribution ratios of the system clock in compliance with the clock allocation information and peculiar to various external devices.

In this manner, communication data transmitted from various external devices are transmitted to the data transmission line respectively in synchronism with the communication timings in compliance with the device reference clocks peculiar to respective external devices and also pulse rising timings which serve as the communication timings for the communication data being transmitted from various external devices respectively are set to be shifted mutually. Therefore, plural communication data can be prevented beforehand from being transmitted simultaneously from different senders and thus collision of the communication data can be avoided firmly. As a result, the communication apparatus which is able to improve communication efficiency remarkably can be realized.

In order to achieve the above object, there is provided, in a communication method for use in a communication system which is constructed by connecting a plurality of communication apparatuses, to which one external device or two or more external devices are connected respectively, via a data transmission line to execute data exchange between any external devices, between any communication apparatuses, or between any external device and any communication apparatus, at least one of communication apparatuses out of the plurality of communication apparatuses can generate clock allocation information assigned to various external devices respectively in connection with distribution ratios of a common system clock among the plurality of communication apparatuses based on all device connection information including type of the external devices which are connected to the plurality of communication apparatuses constituting the communication system, and can transmit the clock allocation information to overall communication apparatuses, including its own communication apparatus, the plurality of communication apparatuses including the at least of communication apparatus execute data can exchange between any sender and any destination based on device reference clocks peculiar to various external devices and distributed at distribution ratios of the system clock according to the clock allocation information, and a plurality of device reference clocks peculiar to the various external devices are set such that respective trailing times of their pulses are shifted mutually with regard to a fact that pulse trailing timings as data communication timings of the various external devices are not generated simultaneously between the external devices.

According to the present invention, at least one of the communication apparatuses out of the plurality of communication apparatuses generates the clock allocation information concerning the distribution ratios of the system clock common to the plurality of communication apparatuses for respective external devices based on the all device connection information, and transmits the generated clock allocation information to all communication apparatuses including own communication apparatus. In response to the clock allocation information, the plurality of communication apparatuses including own communication apparatus execute data exchange between any sender and any destination based on the device reference clocks which are distributed at distribution ratios of the system clock in compliance with the clock allocation information and peculiar to various external devices.

Like this, communication data transmitted from various external devices are transmitted to the data transmission line respectively in synchronism with the communication timings in compliance with the device reference clocks peculiar to respective external devices and also pulse rising timings which serve as the communication timings for the communication data being transmitted from various external devices respectively are set to be shifted mutually. Therefore, plural communication data can be prevented beforehand from being transmitted simultaneously from different senders and thus collision of the communication data can be avoided firmly. As a result, the communication apparatus which is able to improve communication efficiency remarkably can be realized.

In order to achieve the above object, there is provided, in a communication system which is constructed by connecting a plurality of communication apparatuses, to which one external device or two or more external devices are connected respectively, via a data transmission line to execute data exchange between any external devices, between any communication apparatuses, or between any external device and any communication apparatus, at least one of communication apparatuses out of the plurality of communication apparatuses comprising: an all device connection information storing means for storing all device connection information including type of the external devices which are connected respectively to the plurality of communication apparatuses constituting the communication system; a clock allocating means for generating clock allocation information concerning distribution ratios of a system clock which is common among the plurality of communication apparatuses for respective external devices, based on the all device connection information stored in the all device connection information storing means; and a clock allocation information transmitting means for transmitting the clock allocation information generated by the clock allocating means to all communication apparatuses including own communication apparatus; and the plurality of communication apparatuses including the at least one of communication apparatus comprising: a clock allocation information receiving means for receiving the clock allocation information transmitted from the clock allocation information transmitting means; and a data exchange controlling means for controlling data exchange between any sender and any destination, based on device reference clocks peculiar to respective external devices which are distributed at the distribution ratios of the system clock according to the clock allocation information received by the clock allocation information receiving means; wherein the plurality of device reference clocks peculiar to the various external devices respectively are set such that respective rising times of their pulses are shifted mutually with regard to a fact that pulse rising timings as data communication timings of the various external devices are not simultaneously generated mutually between the external devices.

According to the present invention, in at least one of communication apparatuses out of the plurality of communication apparatuses, the clock allocating means generates clock allocation information concerning distribution ratios of the system clock which is common among the plurality of communication apparatuses for respective external devices, based on all device connection information stored in all device connection information storing means, and the clock allocation information transmitting means transmits the clock allocation information generated by the clock allocating means to all communication apparatuses including own communication apparatus.

On the contrary, in the plurality of communication apparatuses including at least one of communication apparatuses, the clock allocation information receiving means receives the clock allocation information transmitted from the clock allocation information transmitting means, and the data exchange controlling means controls data exchange between any sender and any destination, based on device reference clocks which are peculiar to respective external devices and are distributed at the distribution ratios of the system clock according to the clock allocation information received by the clock allocation information receiving means.

In this fashion, communication data transmitted from various external devices are transmitted to the data transmission line respectively in synchronism with the communication timings in compliance with the device reference clocks peculiar to respective external devices and also pulse rising timings which serve as the communication timings for the communication data being transmitted from various external devices respectively are set to be shifted mutually. Therefore, plural communication data can be prevented beforehand from being transmitted simultaneously from different senders and thus collision of the communication data can be avoided firmly. As a result, the communication apparatus which is able to improve communication efficiency remarkably can be realized.

In the preferred embodiment of the present invention, the plurality of device reference clocks peculiar to the various external devices include a command dedicated clock for transmitting a command.

According to this embodiment, since the plurality of device reference clocks peculiar to various external devices are constructed to include the command dedicated clock for command transmission, the communication system which is able to transmit the command from the sender to the destination with a simple configuration can be implemented.

In order to achieve the above object, there is provided, in a communication system which is constructed by connecting a plurality of communication apparatuses, to which one external device or two or more external devices are connected respectively, via a data transmission line to execute data exchange between any external devices, between any communication apparatuses, or between any external device and any communication apparatus, at least one of communication apparatuses out of the plurality of communication apparatuses comprising: an all device connection information storing means for storing all device connection information including type of the external devices which are connected respectively to the plurality of communication apparatuses constituting the communication system; a clock allocating means for generating clock allocation information concerning distribution ratios of a system clock which is common among the plurality of communication apparatuses for respective external devices, based on the all device connection information stored in the all device connection information storing means; and a clock allocation information transmitting means for transmitting the clock allocation information generated by the clock allocating means to all communication apparatuses including own communication apparatus; and the plurality of communication apparatuses including the at least one of communication apparatus comprising: a clock allocation information receiving means for receiving the clock allocation information transmitted from the clock allocation information transmitting means; and a data exchange controlling means for controlling data exchange between any sender and any destination, based on device reference clocks peculiar to respective external devices which are distributed at the distribution ratios of the system clock according to the clock allocation information received by the clock allocation information receiving means; wherein the plurality of device reference clocks peculiar to the various external devices respectively are set such that respective trailing times of their pulses are shifted mutually with regard to a fact that pulse trailing timings as data communication timings of the various external devices are not simultaneously generated mutually between the external devices.

According to the present invention, in at least one of communication apparatuses out of the plurality of communication apparatuses, the clock allocating means generates clock allocation information concerning distribution ratios of the system clock which is common among the plurality of communication apparatuses for respective external devices, based on all device connection information stored in all device connection information storing means, and the clock allocation information transmitting means, transmits the clock allocation information generated by the clock allocating means to all communication apparatuses including own communication apparatus.

While, in the plurality of communication apparatuses including at least one of communication apparatuses, the clock allocation information receiving means receives the clock allocation information transmitted from the clock allocation information transmitting means, and the data exchange controlling means controls data exchange between any sender and any destination, based on device reference clocks which are peculiar to respective external devices and are distributed at the distribution ratios of the system clock according to the clock allocation information received by the clock allocation information receiving means.

In this manner, communication data transmitted from various external devices are transmitted to the data transmission line respectively in synchronism with the communication timings in compliance with the device reference clocks peculiar to respective external devices and also pulse rising timings which serve as the communication timings for the communication data being transmitted from various external devices respectively are set to be shifted mutually. Therefore, plural communication data can be prevented beforehand from being transmitted simultaneously from different senders and thus collision of the communication data can be avoided firmly. As a result, the communication apparatus which is able to improve communication efficiency remarkably can be realized.

In the preferred embodiment of the present invention, the plurality of device reference clocks peculiar to the various external devices include a command dedicated clock for transmitting a command.

According to this embodiment, since the plurality of device reference clocks peculiar to various external devices are constructed to include the command dedicated clock for command transmission, the communication system which is able to transmit the command from the sender to the destination with a simple configuration can be implemented.

The nature, principle and utility of the invention will become more apparent from the following detailed description when read in conjunction with the accompanying drawings.

BRIEF DESCRIPTION OF THE DRAWINGS

In the accompanying drawings:

FIG. 3 is a block circuit diagram showing a configuration of a first receiver according to the first embodiment of the present invention;

FIG. 4 is a timing chart illustrating an operation of the first communication apparatus according to the first embodiment of the present invention;

FIG. 6 is a block circuit diagram showing a configuration of a second communication apparatus according to a second embodiment of the present invention;

FIG. 8 is a block circuit diagram showing a configuration of a second receiver according to the second embodiment of the present invention;

FIGS. 11A and 11B are views showing still another data formats used in the second communication apparatus according to the second embodiment of the present invention respectively;

FIG. 20 is a table showing an example of device connection information referred to in the fourth communication system according to the eighth embodiment of the present invention and the fifth and sixth communication apparatuses according to ninth and tenth embodiments of the present invention;

FIG. 22 is a clock allocation table showing clock allocation states to a plurality of external devices in the fifth and sixth communication apparatuses according to the ninth and tenth embodiments of the present invention.

DESCRIPTION OF THE PREFERRED EMBODIMENTS

Transmitters, receivers, communication apparatuses, communication methods, and communication systems according to plural embodiments of the present invention will be explained with reference to accompanying drawings hereinafter.

Various vehicle-equipped external devices will be illustrated as one or more than two external devices which are connected to a communication apparatus of the present invention respectively, and a vehicle network which is constructed by connecting various vehicle-equipped devices so as to enable data exchange therebetween will be illustrated as an external network connected to the communication apparatus. Where the external network signifies a network, for example, which is constructed by connecting the communication apparatuses, to which one or more than two external devices are connected respectively, via a data transmission line, like a communication system according to the present invention.

Figure 1:
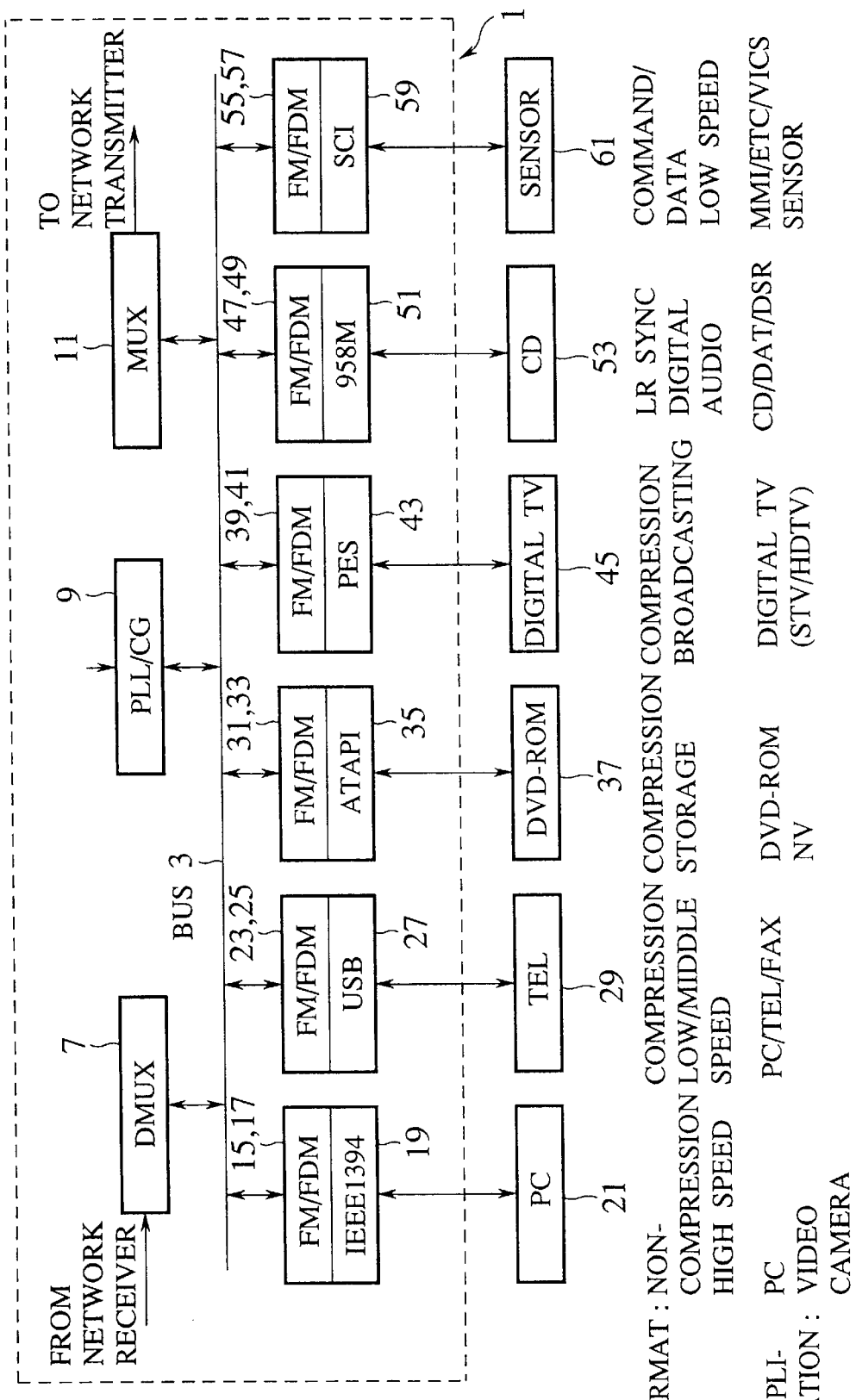
FIG. 1 is a block circuit diagram showing a configuration of a first communication apparatus according to a first embodiment of the present invention.
Figure 2:
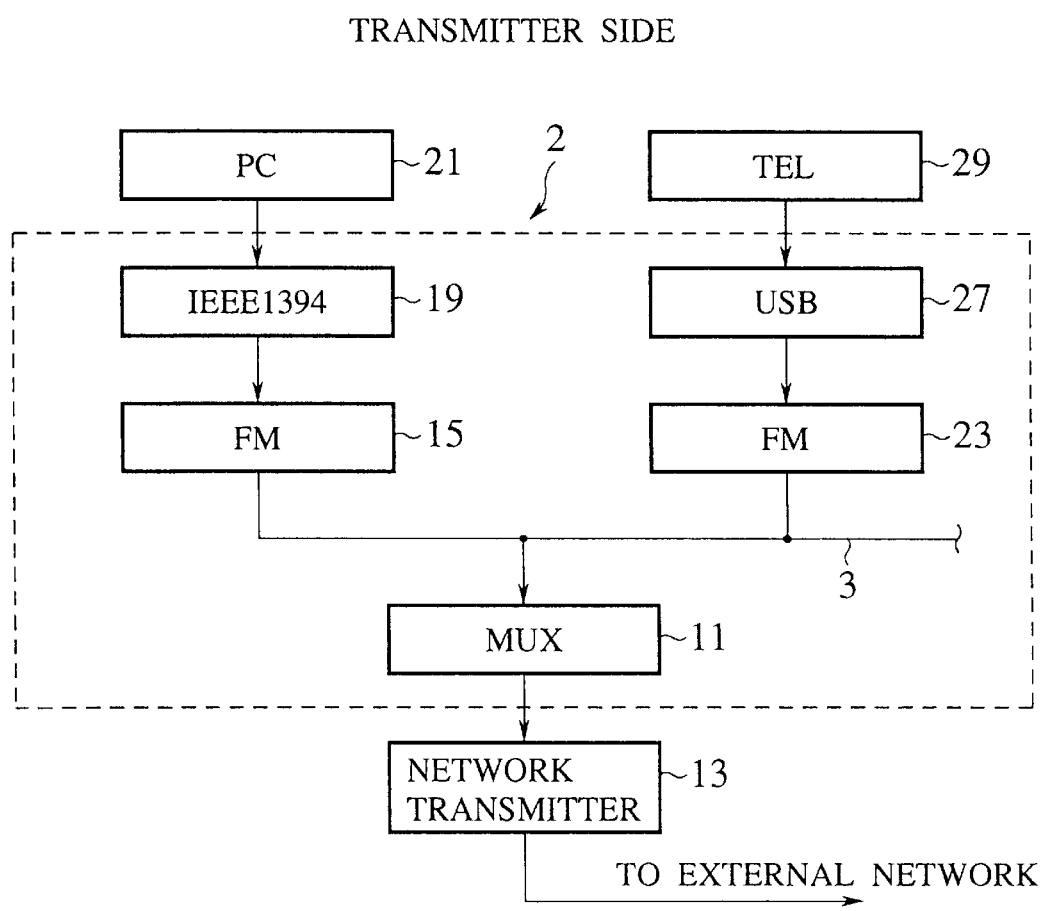
FIG. 2 is a block circuit diagram showing a configuration of a first transmitter according to the first embodiment of the present invention.

First, as shown in FIGS. 1 to 3, a first communication apparatus 1 according to a first embodiment of the present invention is constructed to include a first transmitter 2 and a first receiver 4. The communication apparatus 1 has a function of implementing a centralization process by which various data, etc. are collected on a common data transfer line. More particularly, the centralization process can be achieved by multiplexing digital data which are transmitted from a plurality of external devices via the common data transfer line respectively, then transmitting multiplexed digital data to an external network installed in the vehicle, for example, and then distributing the multiplexed digital data received from the external network by inverse multiplexing and then receiving distributed digital data by a concerned external device via the common data transfer line respectively, whereby the digital data having their natural communication speeds specified based on a plurality of protocols can be communicated via the common data transfer line. The plurality of external devices are composed of a personal computer (PC), a telephone (TEL), etc., for example, and execute data exchange at their natural communication speeds which are specified based on mutually different protocols respectively. As a data transmission system upon connecting the communication apparatus of the present invention to the external network, for example, all kinds of data transmission systems, for example, a radio communication such as an optical communication using a laser beam, a wire communication using an optical fiber cable or a conductor cable, etc. may be employed.

In more detail, the first communication apparatus 1 according to the first embodiment of the present invention comprises a data transfer line (BUS) 3, a distributor or demultiplexer (DMUX) 7, a multiplexer (MUX) 11, various interfaces 19, 27, 35, 43, 51, 59, frequency modulators (FM) 15, 23, 31, 39, 47, 55, frequency demodulators (FDM) 17, 25, 33, 41, 49, 57, and a clock generator (PLL/CG; Phase Lock Loop/Clock Generator) 9. In addition, a personal computer (PC) 21, a mobile telephone (TEL) 29, a DVD-ROM drive 37, a digital TV set 45, a music CD player (CD) 53, a speed sensor 61, all being installed on the vehicle, for example, are connected to the communication apparatus 1. More specifically, the data transfer line (BUS) 3 made of a bus type line, for example, transmits digital data including data such as sound or video data, synchronizing signals, sender and destination information which are transmitted from a plurality of external devices to execute data exchange at their communication speeds specified based on mutually different protocols, or transmitted from the external network. The distributor (DMUX) 7 receives multiplexed digital data via a network receiver 5 which receives the multiplexed digital data transmitted from the external network, and distributes the multiplexed digital data by inverse multiplexing to send out to the data transfer line 3. The multiplexer (MUX) 11 multiplexes the digital data transmitted from a plurality of external devices via the data transfer line 3, and transmits the multiplexed digital data to the external network via a network transmitter 13. Various interfaces 19, 27, 35, 43, 51, 59 are connected to a plurality of external devices 21, 29, 37, 45, 53, 61 in one-by-one correspondence and are normalized so as to fit to respective protocols used for the external devices, and includes an IEEE1394 interface 19, a USB (Universal Serial Bus) interface 27, an ATAPI (AT Attachment Packet Interface) interface 35, a PES (Packetized Elementary Stream) interface 43, a 958M interface 51 which is standardized by SPDIF (CIE/IEC 958) which has been invented by the inventor of the present invention and has already been filed, and enables communication of both standard speed data and n time speed data of a music CD player, and a SCI (Serial Command Interface) interface 59 which is used to communicate command data, etc. The frequency modulators (FM) 15, 23, 31, 39, 47, 55 which are connected to these interfaces 19, 27, 35, 43, 51, 59 in one-by-one correspondence, execute frequency modulation to synchronize output data having their natural communication speeds on respective interfaces with a high frequency of a system clock SYCLK such as 100 MHz on the data transfer line 3, and send out the digital data which are subjected to the frequency modulation to the data transfer line 3. The frequency demodulators (FDM) 17, 25, 33, 41, 49, 57 receive digital data transmitted from the distributor (DMUX) 7 via the data transfer line 3, execute frequency demodulation to synchronize the digital data which have been synchronized with the frequency of the system clock SYCLK on the data transfer line 3 with the natural communication speeds on respective interfaces, and send out the digital data which have been subjected to the frequency demodulation to respective interfaces. The clock generator (PLL/CG) 9 generates reference clocks having respective frequencies such as a system clock SYCLK on the data transfer line 3, a synchronizing signal LRCK for inputting/outputting digital audio data on the 958M interface 51, a clock synchronizing signal BSSYC for packet communication on the IEEE1394 interface 19, the USB interface 27, the ATAPI interface 35, and the PES interface 43, an enable signal RE on the interfaces 19, 27, 35, 43, etc., as shown in FIG. 4, and has a phase lock loop (PLL) function to maintain phases of these reference clocks at high precision, and then supplies the reference clocks to the distributor (DMUX) 7, the multiplexer (MUX) 11, the frequency modulator (FM) 15, 23, 31, 39, 47, 55 and the frequency demodulators (FDM) 17, 25, 33, 41, 49, 57 respectively.

In order to set the frequency of the system clock SYCLK on the data transfer line 3, it is preferable that such frequency may be set to have integral ratios against operation frequencies of respective interfaces, for example, so as to enable easy establishment of synchronization between the frequency of the system clock SYCLK and the operation frequencies while referring to clock frequencies which correspond to the communication speeds peculiar to respective interfaces 19, 27, 35, 43, 51, 59, bit lengths occupied by header information which include synchronizing signals described later, sender and destination, etc. appropriately, and the like.

Next, the first transmitter 2 to which the personal computer (PC) 21 and the mobile telephone (TEL) 29 are connected as external devices according to the first embodiment of the present invention will be explained as an example with reference to FIG. 2 hereunder.

As shown in FIG. 2, the first transmitter 2 according to the first embodiment of the present invention comprises the IEEE1394 interface 19 and the USB interface 27 which are connected the personal computer (PC) 21 and the mobile telephone (TEL) 29 as the external devices in one-by-one correspondence; the frequency modulators (FM) 15, 23 which execute frequency modulation to synchronize output data from the interfaces 19, 27 with the frequency of a system clock SYCLK on the data transfer line 3, and send out the digital data which are subjected to the frequency modulation to the data transfer line 3; the multiplexer (MUX) 11 which multiplexes the digital data transmitted from the external devices 21, 29 via the data transfer line 3, and transmits the multiplexed digital data to the external network via a network transmitter 13; and the clock generator (PLL/CG) 9 (not shown in FIG. 2) which generates various reference clocks having their own natural frequencies such as the system clock SYCLK which is an operation reference clock of the transmitter 2, a clock synchronizing signal BSSYC on the IEEE1394 interface 19 or the USB interface 27, and the enable signal RE on the interfaces 19, 27, etc., and has a phase lock loop (PLL) function to maintain phases of these reference clocks at high precision, and then supplies the reference clocks to the frequency modulator (FM) 15, 23 and the multiplexer (MUX) 11 respectively.

Although the first transmitter 2 according to the first embodiment of the present invention has been explained while taking the case where the personal computer (PC) 21 and the mobile telephone (TEL) 29 are connected as the external devices, the present invention is not limited to this situation. One or more than two any external devices which execute data exchange at their communication speeds specified according to various protocols may be connected in place of the above two system external devices.

Then, the first receiver 4 according to the first embodiment of the present invention will be explained with reference to FIG. 3 while taking the case where the personal computer (PC) 21 and the mobile telephone (TEL) 29 are connected as the external devices, like the transmitter 2.

As shown in FIG. 3, the first receiver according to the first embodiment of the present invention comprises the distributor (DMUX) 7 which receives multiplexed digital data via a network receiver 5 which receives the multiplexed digital data transmitted from the external network, and distributes the multiplexed digital data by inverse multiplexing to send out to the data transfer line 3; the frequency demodulators (FDM) 17, 25 which receive digital data transmitted from the distributor (DMUX) 7 via the data transfer line 3, execute frequency demodulation to synchronize the digital data which have been synchronized with the system clock SYCLK on the data transfer line 3 with the natural communication speeds on respective interfaces 19, 27, and send out the digital data which have been subjected to the frequency demodulation to respective interfaces 19, 27; the IEEE1394 interface 19 and the USB interface 27 which are connected to the personal computer (PC) 21 and the mobile telephone (TEL) 29 as the external devices in one-by-one correspondence; and the clock generator (PLL/CG) 9 (not shown in FIG. 3) which generates various reference clocks having their own natural frequencies such as the system clock SYCLK which is an operation reference clock of the receiver 4, the clock synchronizing signal BSSYC for packet communication on the IEEE1394 interface 19 and the USB interface 27, an enable signal RE on the interfaces 19, 27, and has the phase lock loop (PLL) function to maintain phases of these reference clocks at high precision, and then supplies the reference clocks to the distributor (DMUX) 7 and the frequency demodulators (FDM) 17, 25 respectively.

The first receiver 4 according to the first embodiment of the present invention has been explained while taking the case where the personal computer (PC) 21 and the mobile telephone (TEL) 29 are connected as the external devices, but the present invention is not limited to this situation. One or more than two any external devices which execute data exchange at their communication speeds specified according to various protocols may be connected in place of the above two system external devices.

Next, operations of the first transmitter 2, the first receiver 4, and the first communication apparatus 1 constructed as above according to the first embodiment of the present invention will be explained hereunder. Since operations of the transmitter 2 and the receiver 4 are included in the operation of the communication apparatus 1, their explanations are omitted hereunder.

With the first communication apparatus 1 according to the first embodiment of the present invention, in order to transmit the digital data transmitted from a plurality of external devices 21, 29, 37, 45, 53, 61 respectively to the external network via the data transfer line 3, first of all, the frequency modulation is executed by a plurality of frequency modulators (FM) 15, 23, 31, 39, 47, 55 so as to synchronize the digital data output from a plurality of external devices 21, 29, 37, 45, 53, 61 having their natural communication speeds on a plurality of interfaces 19, 27, 35, 43, 51, 59 respectively with the frequency of the predetermined system clock SYCLK supplied from the clock generator (PLL/CG) 9 on the data transfer line 3. The digital data which are subjected to the frequency modulation are then sent out to the data transfer line 3 respectively.

In other words, as shown in FIG. 4, in the case that a first reference clock frequency which corresponds to the communication speed on the interface connected to a certain external device is a frequency obtained by ⅓ frequency-dividing the predetermined system clock SYCLK on the data transfer line 3, for example, timings of the first reference clock are set such that one rising pulse of the first reference clock is generated during when three rising pulses of the system clock SYCLK are generated for three pulse periods. The digital data output from the certain external device are output to the data transfer line 3 in synchronism with the generation timing of this one rising pulse.

As shown in FIG. 4, as for the first reference clock which corresponds to the communication speed on the interface connected to the certain external device and a second reference clock which corresponds to the communication speed on the interface connected to the external device having the protocol different from that of the above external device, their pulse rising timings are set respectively while taking account of the event that rising timings of both pulses do not occur simultaneously. This principle can be similarly applied between a plurality of reference clocks which correspond to the communication speeds on respective interfaces if three or more external devices are connected via the data transfer line 3, for example.

When received the digital data which are subjected to the above frequency modulation, the multiplexer (MUX) 11 multiplexes the digital data which are input via the data transfer line 3 respectively in synchronism with the system clock SYCLK, and then transmits multiplexed digital data to the external network.

Meanwhile, in order to receive the multiplexed digital data transmitted from the external network by a plurality of external devices 21, 29, 37, 45, 53, 61 via the data transfer line 3, at first the distributor (DMUX) 7 receives the multiplexed digital data being transmitted from the external network, and then distributes the multiplexed digital data by inverse multiplexing in synchronism with the system clock SYCLK to send out to the data transfer line 3. Next, a plurality of frequency demodulators (FDM) 17, 25, 33, 41, 49, 57 receive the digital data sent out from the distributor (DMUX) 7 via the data transfer line 3, then executes the frequency demodulation to synchronize the received digital data which have been synchronized with the frequency of the predetermined system clock SYCLK supplied from the clock generator (PLL/CG) 9 on the data transfer line 3 with the natural communication speeds on the plurality of interfaces 19, 27, 35, 43, 51, 59, and then send out the digital data which have been subjected to the frequency demodulation to the plurality of interfaces 19, 27, 35, 43, 51, 59 respectively. These digital data are then received by the plurality of external devices 21, 29, 37, 45, 53, 61 via the plurality of interfaces 19, 27, 35, 43, 51, 59 respectively.

Therefore, according to the first communication apparatus 1 of the first embodiment of the present invention, a centralization process of digital data can be executed by concentrating the digital data, which being transmitted from a plurality of external devices 21, 29, 37, 45, 53, 61 which can execute data exchange at their natural transmission speeds specified according to mutually different protocols respectively or being transmitted from the external network, onto the common data transfer line 3, a common multiplexer, or a common distributor, and also smooth two-way communications between the external network and the plurality of external devices 21, 29, 37, 45, 53, 61 can be implemented.

Further, according to the first communication apparatus 1 of the first embodiment of the present invention, since the digital data being multiplexed based on a time-division multiplex system on the common data transfer line 3, for example, are transmitted in synchronism with the predetermined system clock on the data transfer line 3, any external device out of the plurality of external devices can access readily such digital data. Hence, as will be described later, according to a third communication apparatus 200 of the third embodiment shown in FIG. 12, smooth two-way communications can be implemented easily between a plurality of external devices other than the above two-way communications between the external network and the plurality of external devices.

Figure 5A:
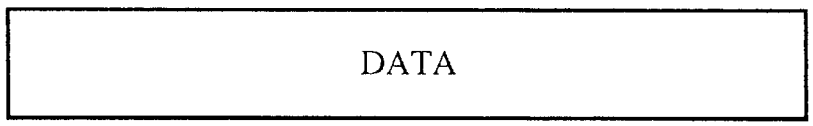
FIGS. 5A and 5B are views showing data formats used in the first communication apparatus according to the first embodiment of the present invention.

The operation of the above first communication apparatus 1 will be explained in more detail. In the plurality of frequency modulators (FM) 15, 23, 31, 39, 47, 55, the frequency modulation is executed to synchronize digital data (DATA) which are received from the plurality of interfaces 19, 27, 35, 43, 51, 59, as shown in FIG. 5A, for example, with the frequency of the system clock SYCLK which is set higher than the frequency corresponding to the natural communication speeds on respective interfaces. As the result of the frequency modulation, for example, the digital data (DATA) shown in FIG. 5A are compressed on the time base like digital data (compression DATA) shown in FIG. 5B, and the compression data are then sent out to the data transfer line 3.

Figure 5B:

In the plurality of frequency demodulators (FDM) 17, 25, 33, 41, 49, 57, the frequency demodulation is executed to synchronize the compression data (Compression DATA) shown in FIG. 5B received via the data transfer line 3, for example, with the natural communication speeds on the plurality of interfaces 19, 27, 35, 43, 51, 59. As the result of the frequency demodulation, for example, the compression data (Compression DATA) shown in FIG. 5B are expanded on the time base like the digital data (DATA) shown in FIG. 5A, and the expansion data are then received by the plurality of external devices 21, 29, 37, 45, 53, 61 via the plurality of interfaces 19, 27, 35, 43, 51, 59.

In the multiplexer (MUX) 11, the digital data are packetized by adding header information (Header) including appropriately synchronizing signal, sender, destination, acknowledge character (ACK), negative acknowledge character (NAK), etc. to heads of the compression data (Compression DATA) transmitted from the plurality of interfaces 19, 27, 35, 43, 51, 59, as shown in FIG. 5B, for example. The packetized digital data are multiplexed and then transmitted to the external network 13.

In the distributor (DMUX) 7, the header information of the packetized digital data received from the external network are interpreted, and then the digital data are distributed by inverse multiplexing to transmit to the interfaces designated as the sender.

In turn, a second transmitter, a second receiver, a second communication apparatus, and a communication method according to a second embodiment of the present invention will be explained with reference to FIGS. 6 to 11 hereunder. In the second embodiment of the present invention, there exist constituent members which are common to those of the above first embodiment of the present invention. Hence, common references refer to the common constituent members in both embodiments and therefore their explanations are omitted. Explanation of differences in structure between the first and second embodiments will be mainly made hereunder.

Figure 7:
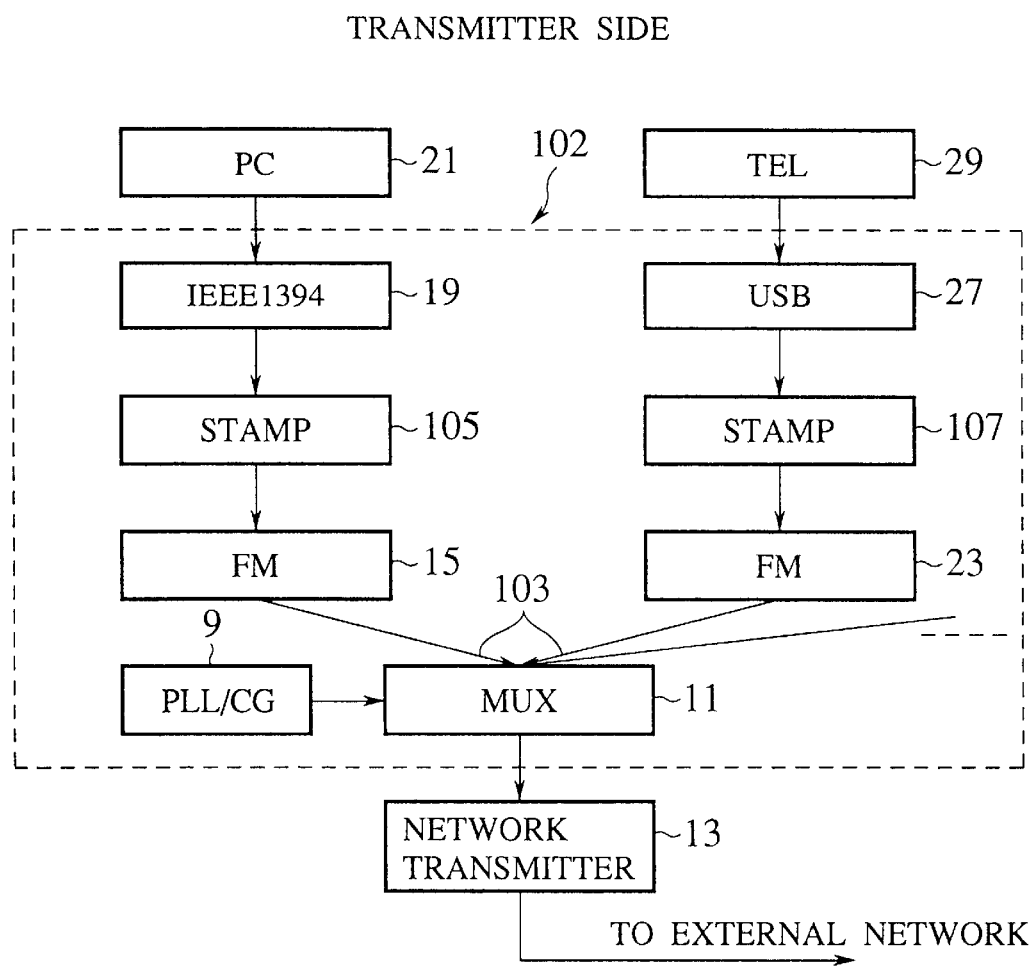
FIG. 7 is a block circuit diagram showing a configuration of a second transmitter according to the second embodiment of the present invention.

First, as shown in FIGS. 6 to 8, a second communication apparatus 101 according to the second embodiment of the present invention is constructed to include a second transmitter 102 and a second receiver 104. The second communication apparatus 101 has a function of implementing the centralization process by which the digital data are collected to the multiplexer and the distributor. More particularly, the centralization process can be achieved by multiplexing the digital data which are transmitted from the plurality of external devices respectively, then transmitting multiplexed digital data to the external network installed in the vehicle, for example, then distributing the multiplexed digital data received from the external network by inverse multiplexing, and then receiving distributed digital data by the concerned external device respectively, whereby the digital data having their natural communication speeds specified based on the plurality of protocols can be collected to the multiplexer and the distributor. The plurality of external devices are composed of a personal computer (PC), a telephone (TEL), etc., for example, and execute data exchange at their natural communication speeds which are specified based on mutually different protocols respectively.

Differences in structure between the second embodiment and the above first embodiment of the present invention reside in that a star-configuration data transfer line is employed as the data transfer line between the distributor (DMUX) 7 and the frequency demodulators (FDM) 17, 25, 33, 41, 49, 57 and between the multiplexer (MUX) 11 and the frequency modulators (FM) 15, 23, 31, 39, 47, 55 and that information adding portions (STAMP) 105, 107, 109, 111, 113, 115 for adding header information (Header), which include synchronizing signals peculiar to respective interfaces, sender, destination, acknowledge character (ACK), negative acknowledge character (NAK), etc. appropriately, to the output data output from respective interfaces are provided between the frequency modulators (FM) 15, 23, 31, 39, 47, 55 and the plurality of interfaces 19, 27, 35, 43, 51, 59.

Operations of the second transmitter, the second receiver, and the second communication apparatus constructed as above according to the second embodiment of the present invention will be explained hereunder. Since operations of the second transmitter 102 and the second receiver 104 are included in the operation of the second communication apparatus 101, their explanations are omitted hereunder.

Figure 9A:
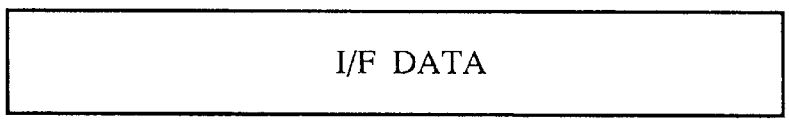
FIGS. 9A and 9B are views showing data formats used in the second communication apparatus according to the second embodiment of the present invention respectively.

According to the second communication apparatus 101 of the second embodiment of the present invention, in order to transmit the digital data transmitted from the plurality of external devices 21, 29, 37, 45, 53, 61 respectively to the external network, first of all, the header information (Header) including synchronizing signals peculiar to respective interfaces, sender, destination, acknowledge character (ACK), negative acknowledge character (NAK), etc. appropriately are added to respective block data (I/F DATA), as shown in FIG. 9A, by information adding portions (STAMP) 105, 107, 109, 111, 113, 115. The block data (I/F DATA) are transmitted from the plurality of interfaces 19, 27, 35, 43, 51, 59 and are divided into plural blocks in a predetermined bit unit, for example, a 32-bit unit, in compliance with data formats peculiar to respective interfaces. In order to add the header information (Header) to the block data (I/F DATA), any information adding scheme may be employed. For example, the header information (Header) may be added to heads of the block data (I/F DATA), otherwise the header information (Header) may be added with the use of empty bits such as user areas in the block data (I/F DATA).

Figure 9B:
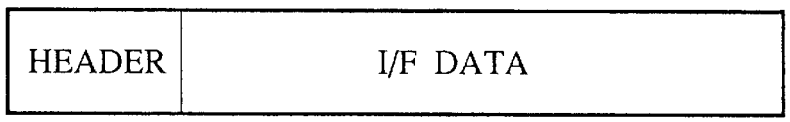

The block data (I/F DATA) to which the header information (Header) are added are formed as data formats which have predetermined bit rates (bit/second) corresponding to natural communication speeds peculiar to the plurality of interfaces 19, 27, 35, 43, 51, 59. The frequency modulations are executed by respective frequency modulators (FM) 15, 23, 31, 39, 47, 55 so as to synchronize the block data (I/F DATA), to which the header information (Header) are added, with the frequency of predetermined system clock of multiplexer side SYCLK in the multiplexer (MUX) 11 supplied from the clock generator (PLL/CG) 9. The digital data which are subjected to the frequency modulation, as shown in FIG. 9B, are then transmitted to the multiplexer (MUX) 11 via the data transfer line 103 respectively.

When received the frequency-modulated digital data transmitted from the plurality of frequency modulators (FM) 15, 23, 31, 39, 47, 55 respectively, the multiplexer (MUX) 11 then multiplexes by synchronizing these digital data with the multiplexer side system clock SYCLK and transmits the multiplexed digital data to the external network.

Figure 10A:
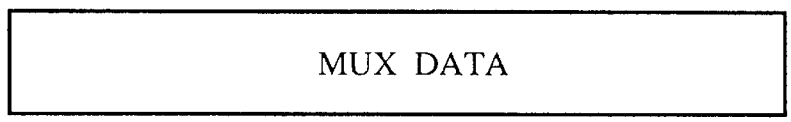
FIGS. 10A and 10B are views showing another data formats used in the second communication apparatus according to the second embodiment of the present invention respectively.
Figure 10B:
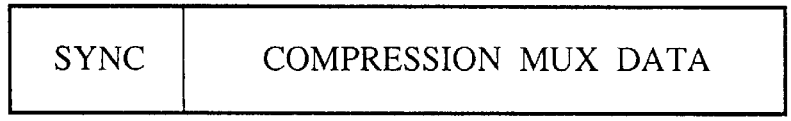

The multiplexed digital data (MUX DATA) multiplexed by the multiplexer (MUX) 11, as shown in FIG. 1A, are transformed into compression digital data (Compression MUX DATA) which are compressed on the time base by executing the frequency modulation to synchronize with the multiplexer side system clock SYCLK, then the synchronizing signals (SYNC) which being in synchronism with the multiplexer side system clock SYCLK are added to empty bit regions generated by such transformation, and then the multiplexed digital data (Compression MUX DATA) to which the synchronizing signals (SYNC) are added, as shown in FIG. 10B, are transmitted to the external network. In place of the case where the multiplexed digital data (Compression MUX DATA) to which the synchronizing signals (SYNC) are added are transmitted, the block data(I/F DATA)to which the header information (Header) shown in FIG. 1A are added may be transmitted to the external network. In this case, start position information indicating a head of block data may be supplemented into the header information (Header).

Modifications of the digital data by a series of above data processes will be explained in more detail with reference to FIGS. 11A and 11B. Modifications are illustrated in FIG. 11A in which header information (Header) are added to respective heads of three types of block data 1 to 3 being set to have mutually different bit lengths respectively. Another modifications are illustrated in FIG. 11B in which compression is applied on the time base and the synchronizing signals (SYNC) are added to three types of block data 1 to 3 with header information (Header).

In the meanwhile, in order to receive the digital data transmitted from the external network by the plurality of external devices 21, 29, 37, 45, 53, 61 respectively, at first the distributor (DMUX) 7 receives the multiplexed digital data being transmitted from the external network, and then distributes the multiplexed digital data by inverse multiplexing in synchronism with the predetermined system clock of distributor side SYCLK in the distributor (DMUX) 7, interprets the header information added to the distributed digital data to specify the sender, and then sends out predetermined digital data to respective external devices. Next, the plurality of frequency demodulators (FDM) 17, 25, 33, 41, 49, 57 receive the digital data sent out from the distributor (DMUX) 7 via the data transfer line 3, then executes the frequency demodulation to synchronize the received digital data which have been synchronized with the frequency of the distributor side system clock SYCLK with the natural communication speeds on the plurality of interfaces 19, 27, 35, 43, 51, 59, and then send out the frequency-demodulated digital data to the plurality of interfaces 19, 27, 35, 43, 51, 59 respectively. These digital data are then received by the plurality of external devices 21, 29, 37, 45, 53, 61 via the plurality of interfaces 19, 27, 35, 43, 51, 59 respectively.

Mutually different frequencies may be employed as the predetermined system clock of distributor side and the predetermined system clock of multiplexer side, while the mutually common frequency may also be employed. In both cases, the centralization process can be implemented by collecting the digital data to the distributor (DMUX) 7 or the multiplexer (MUX) 11.

As still another modification of the second embodiment of the present invention, an information deleting portion for deleting the header information (Header) may be supplemented to the digital data which are received from the distributor (DMUX) 7 via the data transfer line 103 and to which the header information (Header) to allocate the plurality of external devices 21, 29, 37, 45, 53, 61 as the senders are added. In this fashion, the plurality of external devices 21, 29, 37, 45, 53, 61 can receive raw data without extra information after the header information (Header) have been deleted.

As stated above, according to the second communication apparatus 101 of the second embodiment of the present invention, the centralization process of digital data can be executed by concentrating the digital data, which being transmitted from the plurality of external devices 21, 29, 37, 45, 53, 61 which can execute data exchange at their natural transmission speeds respectively or being transmitted from the external network, onto the distributor (DMUX) 7 or the multiplexer (MUX) 11, and also smooth two-way communications between the external network and the plurality of external devices 21, 29, 37, 45, 53, 61 can be implemented.

Further, according to the second communication apparatus 101 of the second embodiment of the present invention, since the digital data being collected to the distributor (DMUX) 7 or the multiplexer (MUX) 11 are transmitted in synchronism with the predetermined system clock in the distributor (DMUX) 7 or the multiplexer (MUX) 11, any external device out of the plurality of external devices can access such digital data. Therefore, as will be described later, according to a fourth communication apparatus 202 of the fourth embodiment shown in FIG. 13, smooth two-way communications can be implemented between the plurality of external devices in addition to the above two-way communications between the external network and the plurality of external devices.

Next, a third communication apparatus according to a third embodiment of the present invention will be explained with reference to FIG. 12 hereunder. In the third embodiment of the present invention, there exist constituent members which are common to those of the above first embodiment of the present invention. Therefore, common references refer to the common constituent members in both embodiments and therefore their explanations are omitted. Explanation of differences in structure between the first and third embodiments will be mainly made hereunder.

Figure 12:
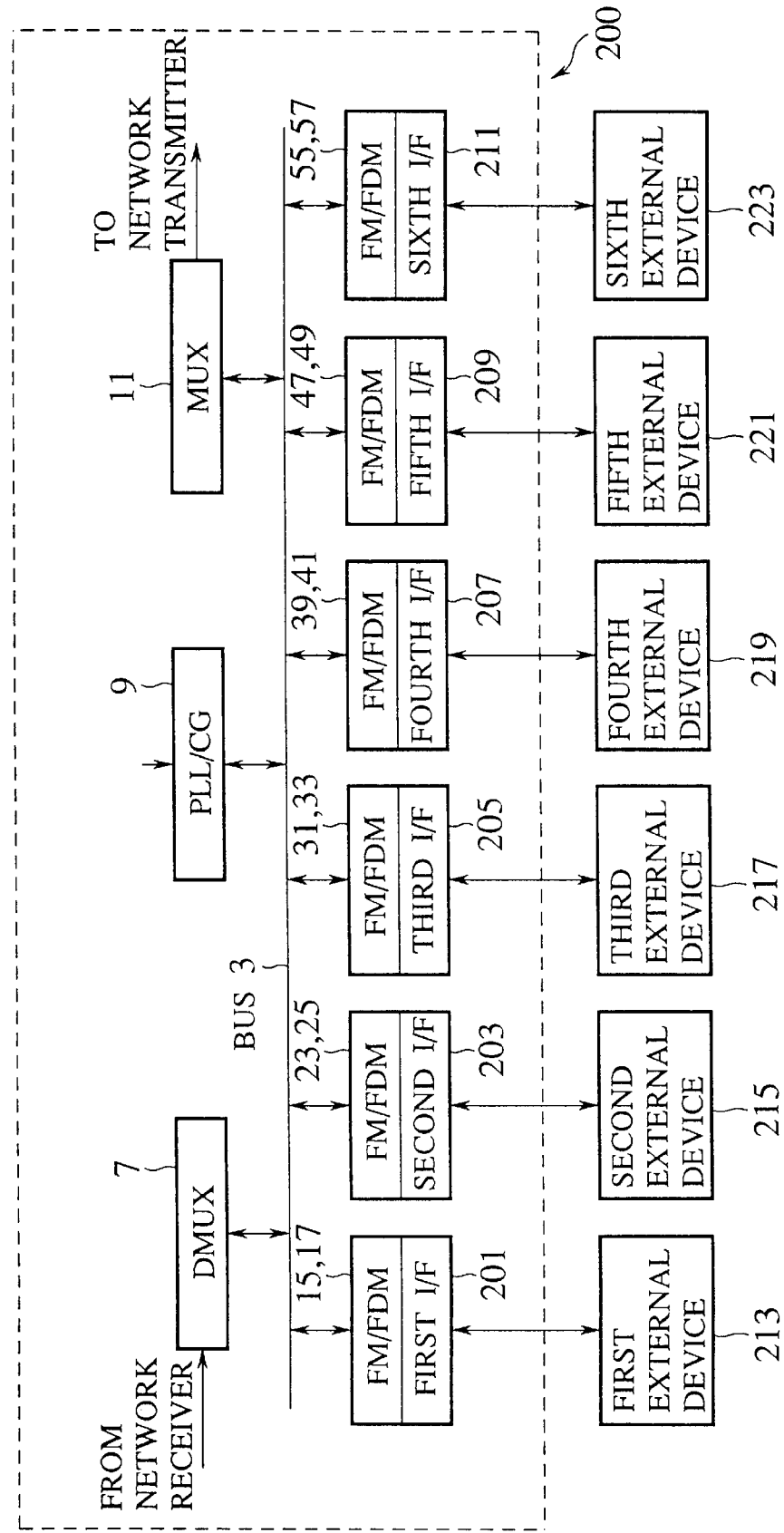
FIG. 12 is a block circuit diagram showing a configuration of a third communication apparatus according to a third embodiment of the present invention, which is a modification of the communication apparatus according to the first embodiment of the present invention.

The third embodiment is different from the first embodiment in that the plurality of external devices which execute data exchange at their communication speeds specified based on their own protocols have been connected to the first communication apparatus 1 according to the first embodiment in structure, but a plurality of first to sixth external devices 213, 215, 217, 219, 221, 223 shown in FIG. 12 are connected to the third communication apparatus 200 according to the third embodiment of the present invention to include the case where the first external device 213 and the second external device 215 can communicate based on a mutually common protocol, for example. In this case, a plurality of first to sixth interfaces (I/F) 201, 203, 205, 207, 209, 211 which constitute a part of the communication apparatus 200 and employ the protocols corresponding to the to-be-connected external devices respectively are connected.

Therefore, according to the third communication apparatus 200 of the third embodiment of the present invention, as in the first embodiment, the digital data being multiplexed based on the time-division multiplex system on the common data transfer line 3, for example, are transmitted in synchronism with the predetermined system clock on the common data transfer line 3, and therefore any external device out of the plurality of external devices can access readily such digital data. In addition, since the plurality of interfaces (I/F) includes those employing mutually common protocols, smooth two-way communications can be implemented easily between the plurality of external devices other than the above two-way communications between the external network and the plurality of external devices.

Subsequently, a fourth communication apparatus according to a fourth embodiment of the present invention will be explained with reference to FIG. 13 hereunder. In the fourth embodiment of the present invention, there exist constituent members which are common to those of the above second embodiment of the present invention. Therefore, common references refer to the common constituent members in both embodiments and therefore their explanations are omitted. Differences in structure between the second and fourth embodiments will be mainly explained hereunder.

Figure 13:
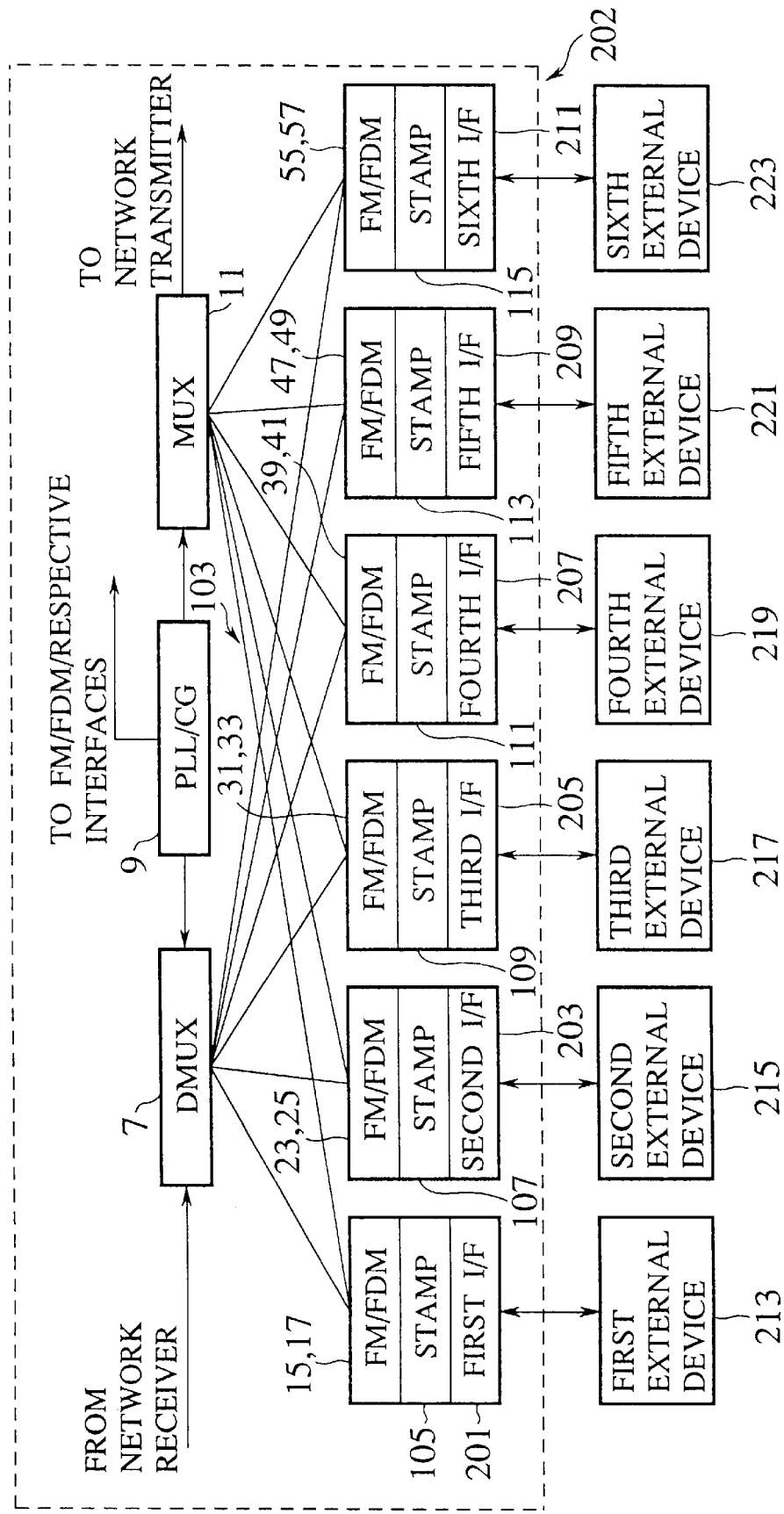
FIG. 13 is a block circuit diagram showing a configuration of a fourth communication apparatus according to a fourth embodiment of the present invention, which is a modification of the communication apparatus according to the second embodiment of the present invention.

The plurality of external devices which execute data exchange at their communication speeds specified based on their own protocols have been connected to the second communication apparatus 101 according to the second embodiment in structure, whereas the plurality of first to sixth external devices 213, 215, 217, 219, 221, 223 shown in FIG. 13 are connected to the third communication apparatus 200 according to the third embodiment of the present invention to include the case where the first external device 213 and the second external device 215 can communicate based on a mutually common protocol, for example. In this case, the plurality of first to sixth interfaces (I/F) 201, 203, 205, 207, 209, 211 which constitute a part of the communication apparatus 200 and employ the protocols corresponding to the to-be-connected external devices respectively are connected.

Hence, according to the fourth communication apparatus 202 of the fourth embodiment of the present invention, like the first embodiment, because the digital data being collected to the distributor (DMUX) 7 or the multiplexer (MUX) 11 are transmitted in synchronism with the predetermined system clock in the distributor (DMUX) 7 or the multiplexer (MUX) 11, any external device out of the plurality of external devices can access readily such digital data. Moreover, since the plurality of interfaces (I/F) includes those employing mutually common protocols, smooth two-way communications can be implemented easily between the plurality of external devices other than the above two-way communications between the external network and the plurality of external devices.

Figure 16:
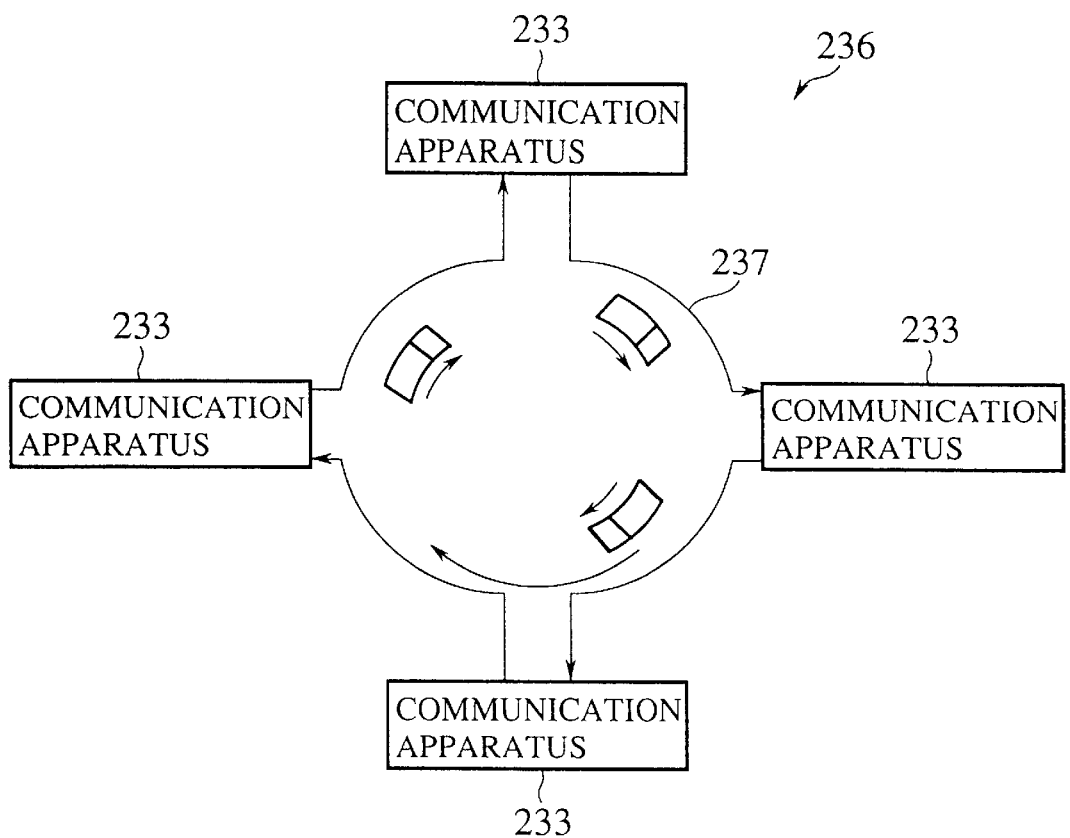
FIG. 16 is a schematic block diagram showing a third communication system according to a seventh embodiment of the present invention.

First to third communication systems according to fifth to seventh embodiments of the present invention will be explained in brief with reference to FIGS. 14 and 16 hereinbelow. In order to distinguish data carrying medium provided in the inside of the above communication apparatus from data carrying medium provided in the communication system, the data carrying medium provided in the inside of the communication apparatus is called a data transfer line, while the data carrying medium provided in the communication system is called a data transmission line.

Figure 14:
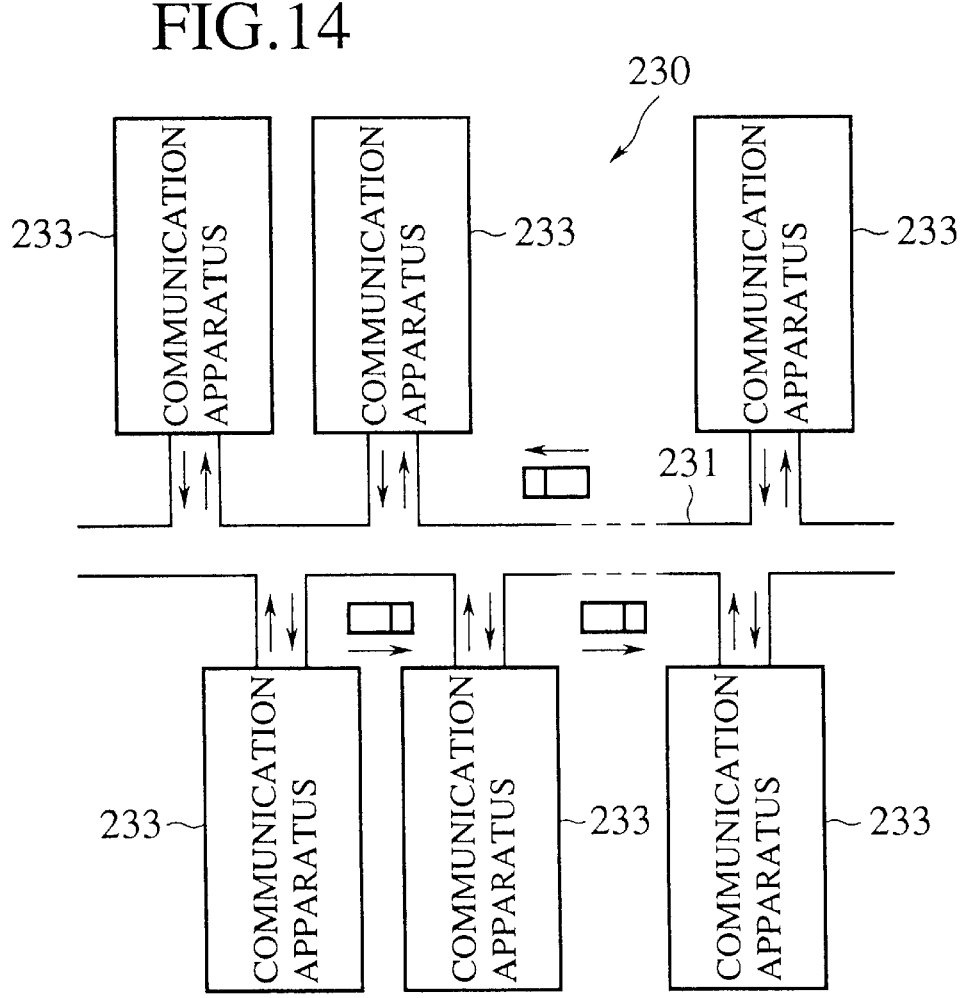
FIG. 14 is a schematic block diagram showing a first communication system according to a fifth embodiment of the present invention.
Figure 15:
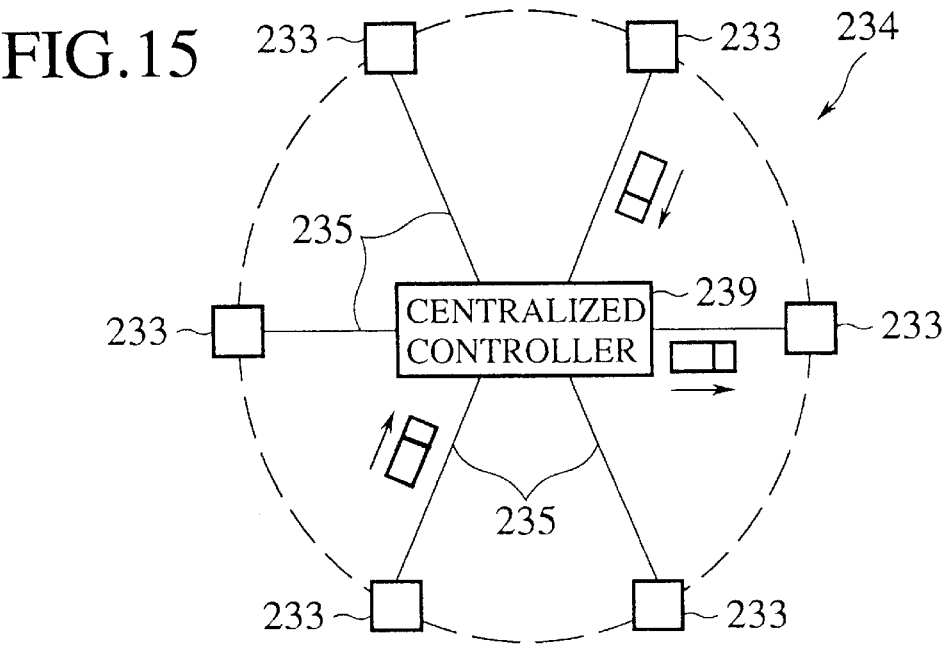
FIG. 15 is a schematic block diagram showing a second communication system according to a sixth embodiment of the present invention.

A first communication system 230 according to a fifth embodiment of the present invention is shown FIG. 14 wherein a plurality of communication apparatuses 233, 233, . . . are connected via a bus-type data transmission line 231. A second communication system 234 according to a sixth embodiment of the present invention is shown in FIG. 15 wherein a plurality of communication apparatuses 233, 233, . . . are connected via a star-configuration data transmission line 235 which is arranged around one centralized controller 239. A third communication system 236 according to a seventh embodiment of the present invention is shown in FIG. 16 wherein a plurality of communication apparatuses 233, 233, . . . are connected via a ring-type data transmission line 237.

The first communication system 230 or the third communication system 236 is so constructed that the plurality of communication apparatuses 233 can access the data transmission lines 231 or 237 at natural timing periods which are set in respective communication apparatuses 233 to synchronize with the common system clock among the communication apparatuses 233 upon data transmission. Therefore, in the first communication system 230 or the third communication system 236, a new access control system is employed in which the timing periods peculiar to respective communication apparatuses 233 are set to be shifted mutually such that the access issued from the plurality of communication apparatuses 233 to the data transmission line 231 or 237 to transmit the digital data are not simultaneously generated.

In particular, for example, in order to execute data exchange between the sender communication apparatus and the destination communication apparatus, at first a communication route is generated by establishing a predetermined timing clock used commonly between both communication apparatuses, then the sender communication apparatus executes data transmission in synchronism with a predetermined timing clock and the destination communication apparatus executes data reception in synchronism with the predetermined timing clock.

Accordingly, the plurality of communication apparatuses 233 can access the data transmission lines 231, 237 in parallel respectively with avoiding collision of data. As a result, smooth two-way communications between any communication apparatuses can be realized while assuring excellent real-time facility.

In the second communication system 234, the plurality of communication apparatuses 233 are constructed so as to access the centralized controller 239 at their timing periods peculiar to respective communication apparatuses 233 in synchronism with the common system clock among the plurality of communication apparatuses 233. Therefore, in this second communication system 234, a new access control scheme is employed wherein the timing periods peculiar to respective communication apparatuses 233 are set to be shifted mutually such that access to the centralized controller 239 are not simultaneously generated from the plurality of communication apparatuses 233.

Accordingly, the plurality of communication apparatuses 233 can access the data transmission lines 231, 237 in parallel respectively with avoiding collision of data. Consequently, smooth two-way communications between any communication apparatuses can be realized while assuring excellent real-time facility. In addition, the communication system having a simple configuration to which the centralized controller and the buffer memory for storing overflow data temporarily are not required can be achieved.

The first to third communication systems 230, 234, 236 may be constructed such that one or more than two external devices are connected to the plurality of communication apparatuses respectively. In this case, the first to third communication systems 230, 234, 236 are able to exchange the digital data between any external devices, between any external device and any communication apparatus, or between any communication apparatuses.

Next, a fourth communication system according to an eighth embodiment of the present invention will be explained with reference to FIG. 17 in more detail hereunder.

Figure 17:
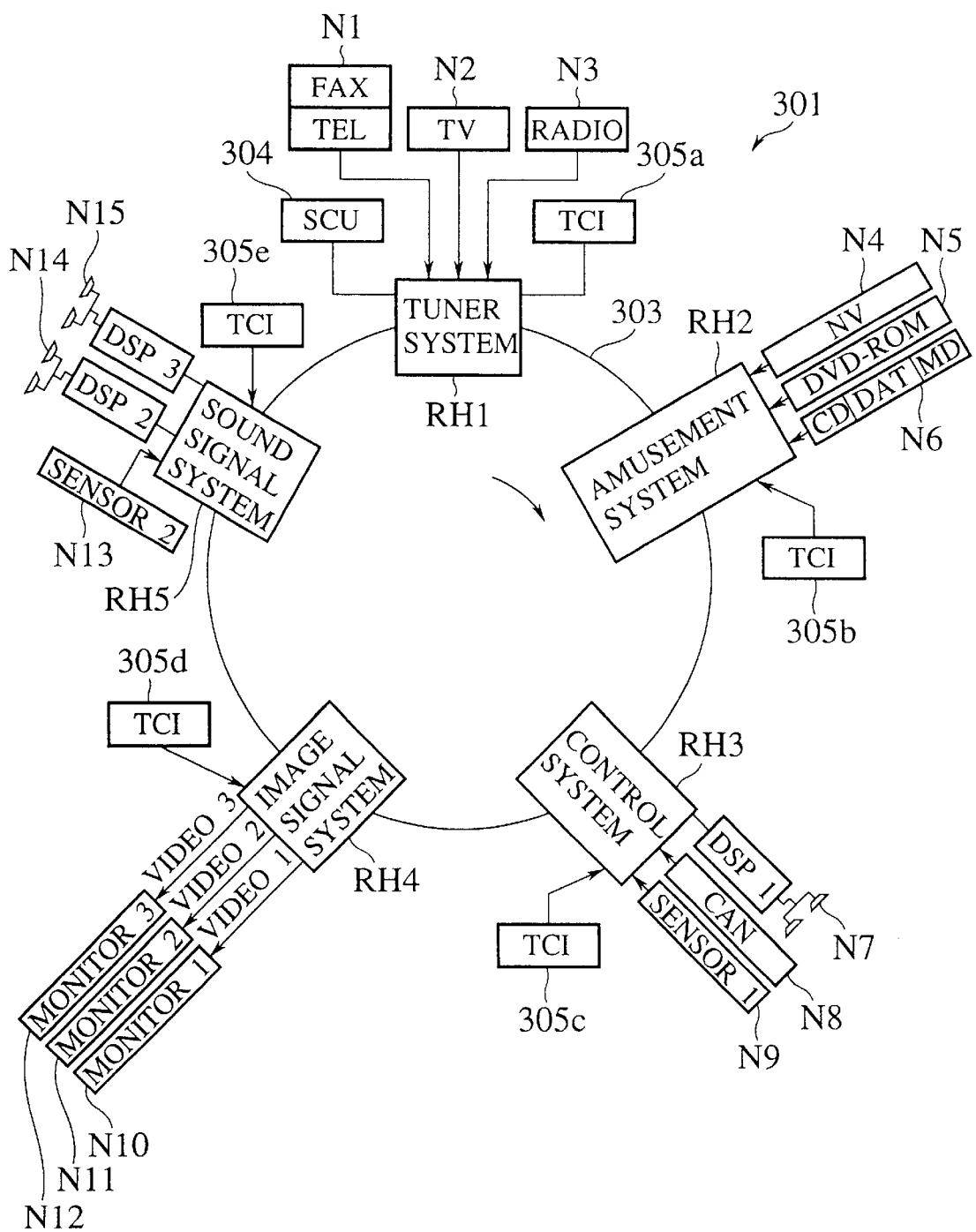
FIG. 17 is a schematic block diagram showing a fourth communication system according to an eighth embodiment of the present invention.

As shown in FIG. 17, the fourth communication system 301 according to the eighth embodiment of the present invention is constructed by connecting mutually a plurality of root hubs RH1, RH2, RH3, RH4, RH5 serving as the communication apparatuses via a loop data transmission line 303 to enable data exchange therebetween. A system control unit (SCU) 304 which can control and manage synchronization control of overall communication system 301, etc. is connected to the root hub RH1. As a network topology of the communication system 301, appropriate type such as bus type, or star type, for example, may be adopted in addition to the above loop type.

One or more than two external devices N1 to N15 are connected to the plurality of root hubs RH respectively. The plurality of root hubs RH are constructed so as to enable data exchange mutually between any external devices N, between any root hubs RH, or between any external device N and any root hub RH via the data transmission line 303. Various external devices may be considered as the external devices N, for example, a mobile telephone, a facsimile device (FAX), a digital TV set, a radio receiver, a navigation system (NV), a DVD-ROM drive, a CD player, a DAT (Digital Audio Taperecorder), an MD (Mini Disc) player, an audio amplifier in which a digital signal processor (DSP) is built, a CAN (Controller Area Network) data bus, various sensors such as azimuth sensor, speed sensor, etc., a monitor device, a vehicle-equipped personal computer, and the like.

The plurality of root hubs RH are divided into respective functional units, for example, a tuner system for receiving radio waves such as TV or radio broadcast from the external devices N such as TV or radio station; an amusement system to which sound signals, video signals, traffic snarl information, etc. are supplied from the external devices N such as NV; a control system to which control information is supplied from the external devices such as various sensors; an image signal system which supplies the image signals to the monitor devices, etc.; a sound signal system which provides the sound signals to the audio amplifier which has the built-in digital signal processor (DSP), etc.

Specific device addresses such as RH1, RH2, . . . , RH5 are set individually to respective root hubs RH previously, while specific device addresses such as N1, N2, . . . , N15 are set individually to respective external devices N previously. These specific device addresses are used to designate the sender or the destination when data exchange are executed between the root hubs RH, between the external devices N, or the external devices N and the root hubs RH via the data transmission line 3.

Besides, device connection information storing devices (TCI) 305a, 305b, 305c, 305d, 305e which are made up of microcomputers, for example, are connected to the plurality of root hubs RH respectively. The device connection information storing devices (TCI) 305 can store device connection information in which types of the external devices N being connected to respective root hubs RH are correlated with I/F numbers 1, 2, 3 of three device interfaces (abbreviated as "device I/F" hereinafter) which are connected to individual root hubs RH, for example.

The device connection information stored in the device connection information storing devices (TCI) 305 will be explained to take the root hub RH3 an example, for instance. The device connection information for the root hub RH3 indicates that the DSP 1 (OUT) is connected to the I/F number "1" of the root hub RH3, the CAN (IN) is connected to the I/F number "2" of the root hub RH3, and the sensor 1 (IN) is connected to the I/F number "3" of the root hub RH3. If the device connection information are supplied to the root hubs RH respectively, types of the external devices N are being connected to individual root hubs RH can be grasped in respective root hubs RH.

Next, a fifth communication apparatus according to a ninth embodiment of the present invention will be explained with reference to FIG. 18 hereunder, while illustrating the case where it is applied to the communication apparatus constituting the above fourth communication system 301. In this case, the root hubs RH constituting the fourth communication system 301 shown in FIG. 17 corresponds to the fifth communication apparatus according to the ninth embodiment of the present invention.

In the fifth communication apparatus according to the ninth embodiment, there exist constituent members which are common to those of the communication apparatus according to the above first embodiment of the present invention shown in FIG. 1. Hence, common references refer to the common constituent members in both embodiments and therefore their explanations are omitted. Explanation of differences in structure between the first and ninth embodiments will be mainly made hereunder.

In addition to the configuration of the communication apparatus 1 according to the first embodiment, the fifth communication apparatus 401 according to the ninth embodiment of the present invention further comprises a device memory 403, a system memory 405 as an all device connection information storing means, and a clock allocation portion 407 as a clock allocation means. A master operation block 409 is composed of the system memory 405 and the clock allocation portion 407. This master operation block 409 is constructed to execute its function when the fifth communication apparatus 401 operates as the master communication apparatus in the fourth communication system 301. In the fourth communication system 301, when one certain communication apparatus operates as the master communication apparatus, other communication apparatuses operate as slave communication apparatuses.

The device memory 403 has a function for storing the device connection information which are acquired from the device connection information storing devices (TCI) 305 connected to own communication apparatus 401. The device connection information stored in the device memory 403 are read out by the multiplexer (MUX) 11, for example, and are then referred to in the multiplexer (MUX) 11 when sender addresses are added to the communication data transmitted from own communication apparatus 401 or the external devices N connected to own communication apparatus 401, and forth.

The system memory 405 is constructed, as shown in FIG. 20, for example, to store the device connection information in all communication apparatuses constituting the fourth communication system 301. In the device connection information, types of the external devices N which are connected to the plurality of communication apparatuses respectively are correlated with the I/F numbers 1, 2, 3 of three devices I/F, for example, which are installed in the communication apparatuses respectively.

The clock allocation portion 407 is constructed to generate clock allocation information regarding appropriate distribution ratios of the common system clock SYCLK among the plurality of communication apparatuses for respective external devices N, as shown in FIG. 22, for example, based on the all device connection information, and then send out the clock allocation information to the multiplexer (MUX) 11. Such all device connection information are stored in the system memory 405 and includes types and transmission capacities of the external devices which are connected to the plurality of communication apparatuses constituting the fourth communication system 301 respectively. When the multiplexer (MUX) 11 receives the clock allocation information, it transmits the clock allocation information to all communication apparatuses including own communication apparatus 401. Then, based on the device reference clocks CK which are peculiar to various external devices N and are distributed at distribution radios of the system clock SYCLK in compliance with the clock allocation information, the plurality of communication apparatuses including own communication apparatus 401 can execute data exchange control between any senders and any destinations, for example, the TEL/FAX (N1) and the DSP3 (N15).

The device reference clocks CK which are peculiar to various external devices N and are distributed at distribution radios of the system clock SYCLK in compliance with the clock allocation information will be explained with reference to FIGS. 21A to 21K hereinbelow.

Figure 21:
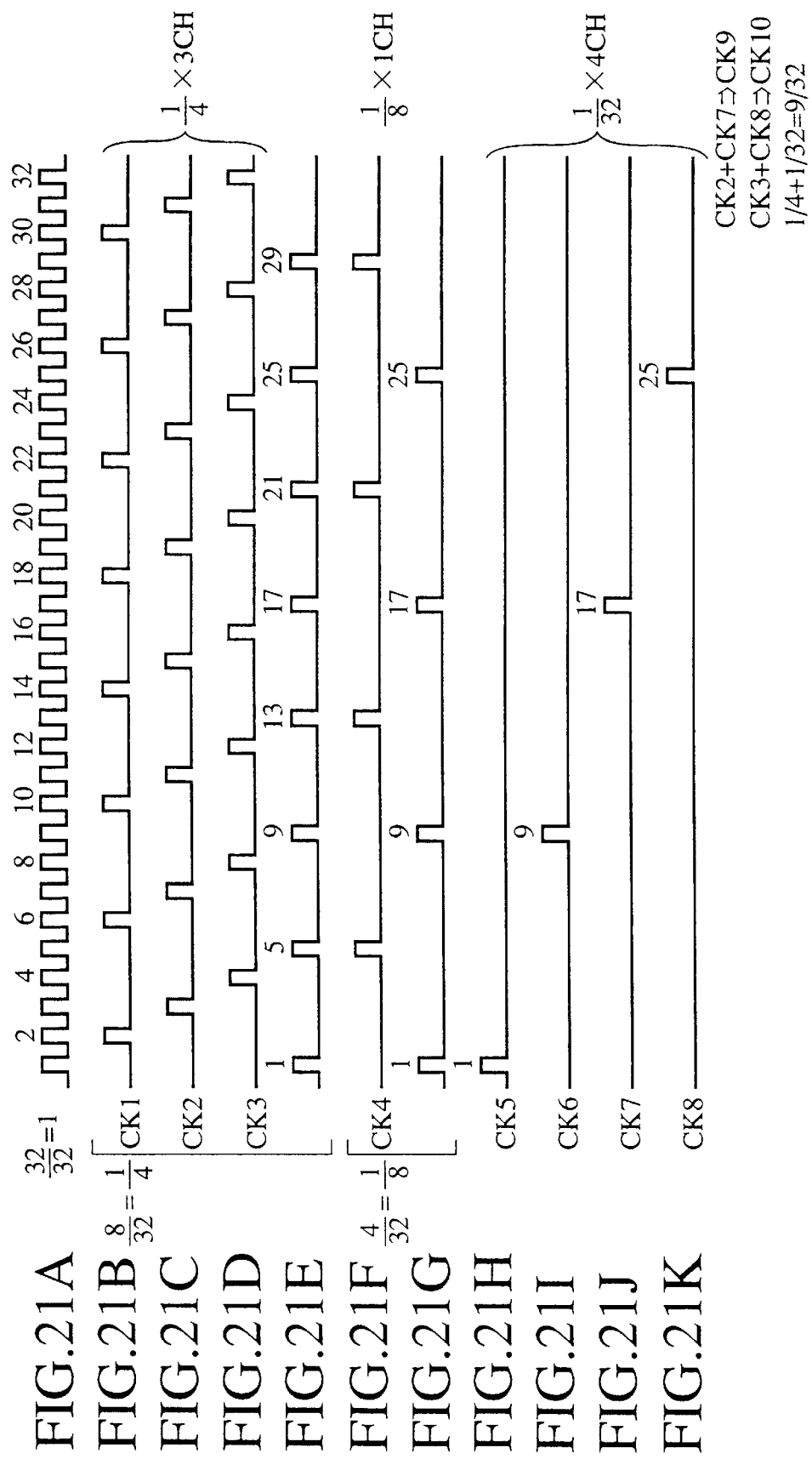
FIGS. 21A to 21K are timing charts illustrating examples of device reference clocks allocated respectively to various external devices in the fifth and sixth communication apparatuses according to the ninth and tenth embodiments of the present invention.

The system clock SYCLK is shown in FIG. 21A. First to eighth device reference clocks CK1, CK2, . . . , CK8 which are generated by frequency-dividing the system clock SYCLK appropriately are shown in FIGS. 21B to 21I, and ninth and tenth device reference clocks CK9, CK10 which are generated by adding the device reference clocks CK being generated by frequency-dividing the system clock SYCLK appropriately are shown in FIGS. 21J and 21K.

The first to third device reference clocks CK1, CK2, CK3 for three channels are communication timing clocks which can be derived by ¼ frequency-dividing the system clock SYCLK. The device reference clocks CK1, CK2, CK3 are allocated to the external devices N such as the TEL/FAX, for example, which have a relatively high frequency of use.

The fourth device reference clock CK4 for one channel is a communication timing clock which can be derived by ⅛ frequency-dividing the system clock SYCLK. The device reference clock CK4 is allocated to the external devices N such as various sensors, the CAN (Controller Area Network) data bus, the command dedicated clock used to transmit the command, for example, which can be sufficiently operated at a relatively low communication speed. As shown in FIG. 22, the fourth device reference clock CK4 for one channel can be divided into plural subchannels by applying suitable processes such as frequency division, addition, etc. to the fourth device reference clock CK4 for one channel, and then such subchannels can be allocated to respective sensors, the CAN data bus, etc. Since the device reference clocks are constructed to include the command dedicated clock used for transmitting the command, the communication system which is able to transmit the command from the sender to the destination can be implemented with a simple system configuration.

In addition, the fifth to eighth device reference clocks CK5, CK6, CK7, CK8 for four channels are communication timing clocks which can be derived by 1/32 frequency-dividing the system clock SYCLK. The device reference clocks CK1, CK2, CK3 are allocated to the external devices N such as the CD player, the DAT, the MD player, the radio receiver, the NV (navigation) system, etc., for example.

The ninth device reference clock CK9 for one channel is a communication timing clock which can be generated by executing logical sum of the second device reference clock CK2 and the seventh device reference clock CK7. The ninth device reference clock CK9 is allocated to the external devices N such as the DVD-ROM drive, etc., for example.

The tenth device reference clock CK10 for one channel is a communication timing clock which can be generated by executing logical sum of the third device reference clock CK3 and the eighth device reference clock CK8. The tenth device reference clock CK10 is allocated to the external devices N such as the digital TV set, etc., for example.

When the plurality of device reference clocks CK peculiar to various external devices respectively are generated by distributing the system clock SYCLK as described above, an important respect is that respective pulse rising timings of the plurality of device reference clocks CK are set to be shifted among the external devices while considering the fact that pulse rising timings which serve as data communication timings of respective external devices N are not simultaneously generated among the external devices mutually. As the data communication timings of various external devices N, pulse trailing timings may be employed instead of pulse rising timings.

In this fashion, according to the fifth communication apparatus of the ninth embodiment of the present invention, the clock allocation information concerning appropriate distribution ratios of the system clock for respective external devices are generated based on the all device connection information, and the generated clock allocation information are transmitted to all communication apparatuses including own communication apparatus. The all device connection information are stored in the all device connection information storing means and include types of the external devices connected to the plurality of communication apparatuses constituting the communication system respectively. In response to the clock allocation information, the plurality of communication apparatuses including own communication apparatus can execute data exchange control between any sender and any destination, e.g., between the external devices, based on the device reference clocks which are peculiar to various external devices and distributed at distribution ratios of the system clock in compliance with the clock allocation information.

Accordingly, communication data transmitted from various external devices are transmitted to the data transmission line respectively in synchronism with the communication timings in compliance with the device reference clocks peculiar to respective external devices. In addition, pulse rising timings or pulse trailing timings which serve as the communication timings for the communication data being transmitted from various external devices respectively are set to be shifted mutually. For this reason, communication data can be prevented beforehand from being transmitted simultaneously from different senders and therefore collision between the communication data can be avoided firmly. As a result, the communication apparatus which is able to contribute an improvement in communication efficiency of the communication system can be realized.

According to the fourth communication system 301 in which the plurality of communication apparatuses according to the eighth embodiment of the present invention are connected via the data transmission line, collision of the communication data can be surely avoided and as a result the communication system which is able to improve the communication efficiency extremely can be implemented.

Figure 19:
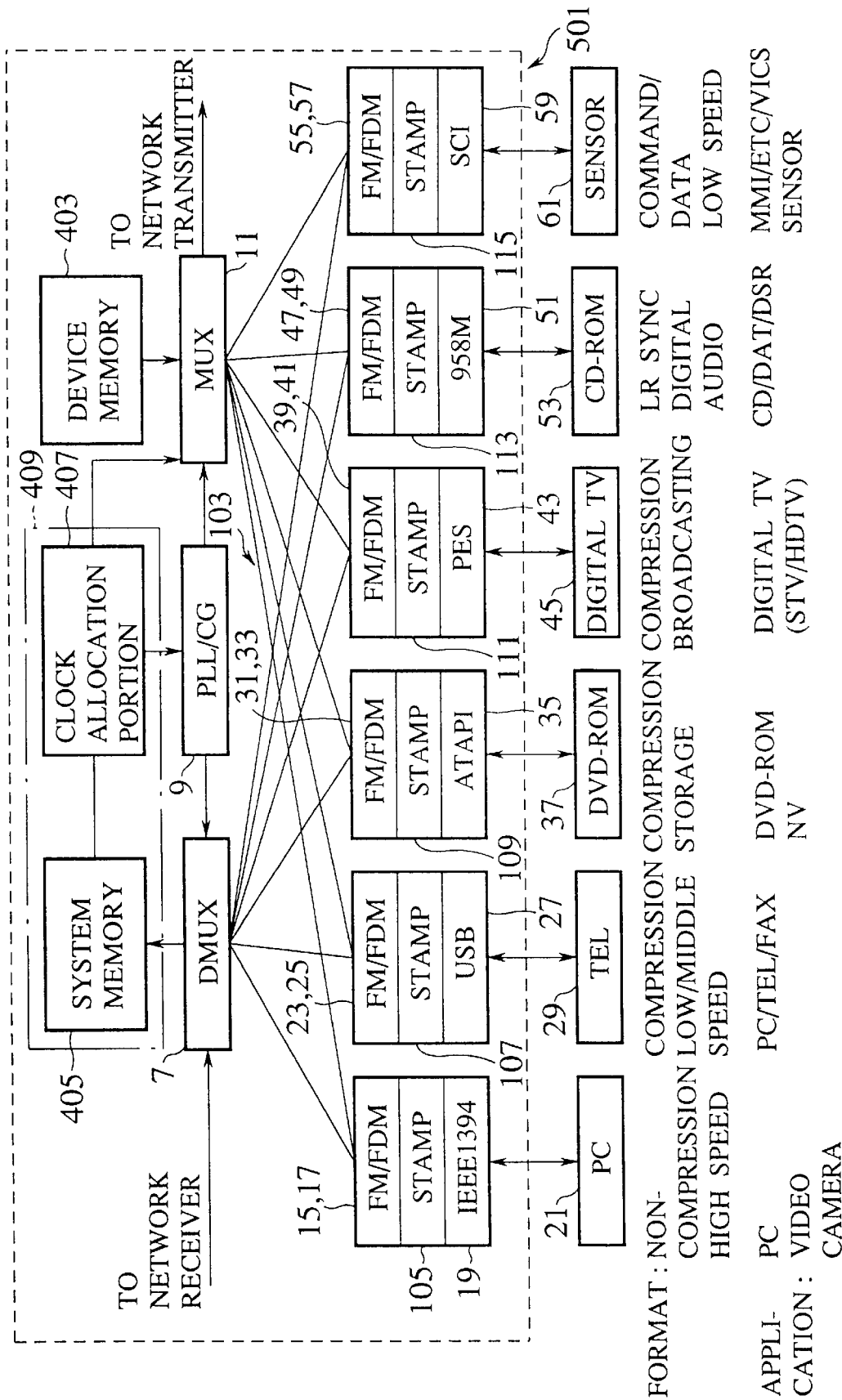
FIG. 19 is a block circuit diagram showing a configuration of a sixth communication apparatus according to a tenth embodiment of the present invention, which is another modification of the second communication apparatus according to the second embodiment of the present invention.

Next, a sixth communication apparatus according to a tenth embodiment of the present invention will be explained with reference to FIG. 19 hereunder while illustrating the case where such communication apparatus is applied to the communication apparatus constituting the above fourth communication system 301. In this case, the root hubs RH constituting the fourth communication system 301 shown in FIG. 17 correspond to the communication apparatuses according to the tenth embodiment of the present invention.

Figure 18:
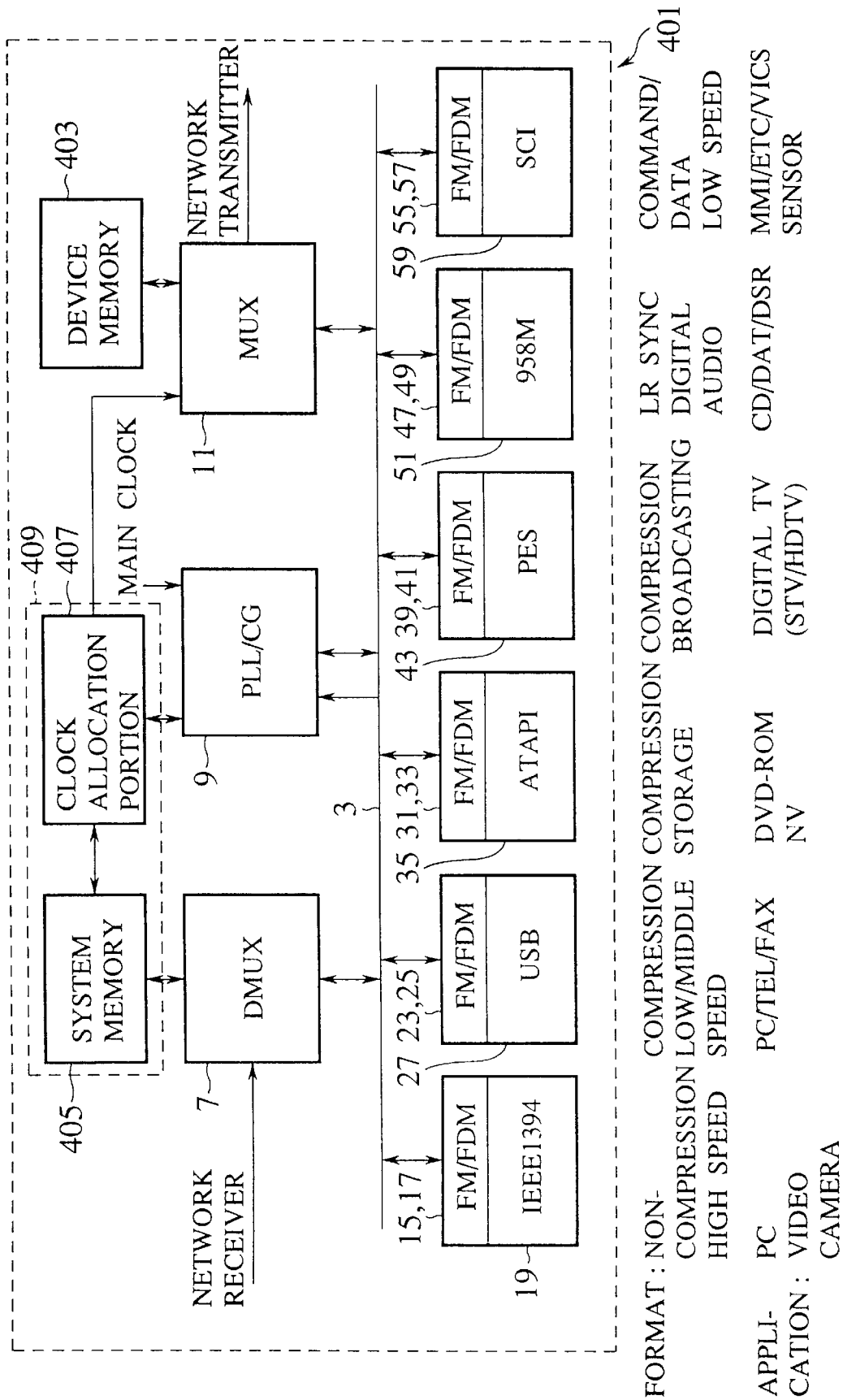
FIG. 18 is a block circuit diagram showing a configuration of a fifth communication apparatus according to a ninth embodiment of the present invention, which is another modification of the first communication apparatus according to the first embodiment of the present Invention.

In the sixth communication apparatus according to the tenth embodiment of the present invention, there exist constituent members which are common to those of the second communication apparatus according to the second embodiment shown in FIG. 6 and those of the fifth communication apparatus according to the ninth embodiment shown in FIG. 18. Hence, since common references are assigned to the common constituent members in the embodiments, their explanations are omitted. Explanation of differences in structure between the tenth embodiment and the second and fifth embodiments will be mainly made hereunder.

In addition to the configuration of the communication apparatus 101 according to the second embodiment, the sixth communication apparatus 501 according to the ninth embodiment of the present invention further comprises the device memory 403, the system memory 405 as the all device connection information storing means, and the clock allocation portion 407 as the clock allocation means.

According to the sixth communication apparatus of the tenth embodiment of the present invention, like the fifth communication apparatus of the ninth embodiment, the communication data being transmitted from respective external devices N are transmitted to the data transmission line 303 in synchronism with the communication timings in compliance with the device reference clocks CK peculiar to respective external devices. In addition, pulse rising timings or pulse trailing timings which serve as the communication timings for the communication data being transmitted from various external devices N respectively are set to be shifted mutually. Therefore, communication data can be prevented in advance from being transmitted simultaneously from different senders and therefore collision between the communication data can be avoided firmly. As a result, the communication apparatus which is able to contribute an improvement in communication efficiency of the communication system can be realized.

According to the fourth communication system 301 in which the plurality of communication apparatuses according to the eighth embodiment of the present invention are connected via the data transmission line, collision of the communication data can be surely avoided and as a result the communication system which is able to improve the communication efficiency extremely can be implemented.

Though has been explained in detail, the present invention should not be limited to the above embodiments and other embodiments may be accomplished by modifying the present invention appropriately.

That is to say, for example, various standards such as the IEEE1394, the USB, etc. have been illustrated as the protocols for the interfaces being connected to the plurality of external devices in one-by-one correspondence in the communication apparatus of the embodiments of the present invention, but the present invention should not be limited to such instance. For example, the present invention can correspond to any interfaces based on the standards other than the protocols described in the above embodiments.

Finally, although the case where the present invention is applied to the vehicle-equipped network has been illustrated in the above embodiments, the present invention is not limited to such case. Needless to say, the present invention may be applied to all types of the communication systems.

What is claimed is:

1. A transmitter comprising:
    a data transfer line for transferring digital data;
    a plurality of interfaces connected to a plurality of external devices in one-by-one correspondence, and constructed so as to fit to transmission speeds peculiar to said plurality of external devices respectively;
    a plurality of frequency modulators connected to said plurality of interfaces in one-by-one correspondence, for executing a frequency modulation to synchronize said digital data which have natural transmission speeds on respective interfaces with a predetermined system clock on said data transfer line, and then sending out said digital data which are subjected to said frequency modulation to said data transfer line respectively;
    a multiplexer for multiplexing said digital data which are transmitted from said plurality of frequency modulators via said data transfer line in synchronism with said predetermined system clock, and then transmitting multiplexed digital data to an external network; and
    a clock generator for generating reference clocks including said predetermined system clock, and then supplying said reference clocks to said plurality of frequency modulators and said multiplexer respectively.

2. A receiver comprising:

a data transfer line for transferring digital data;

a distributor for receiving multiplexed digital data transmitted from an external network, and then distributing said multiplexed digital data by inverse multiplexing in synchronism with a predetermined system clock on said data transfer line to send out to said data transfer line;

a plurality of interfaces connected to a plurality of external devices in one-by-one correspondence, and constructed so as to fit to transmission speeds peculiar to said plurality of external devices respectively;

a plurality of frequency demodulators for receiving digital data output from said distributor via said data transfer line, then executing a frequency demodulation to synchronize input data which have been synchronized with said predetermined system clock on said data transfer line with said natural transmission speeds on said plurality of interfaces respectively, and then sending out said digital data which are subjected to said frequency demodulation to said plurality of interfaces respectively; and a clock generator for generating reference clocks including said predetermined system clock, and then supplying said reference clocks to said distributor and said plurality of frequency demodulators respectively.

3. A communication apparatus comprising:

a data transfer line for transferring digital data;

a distributor for receiving multiplexed digital data transmitted from an external network, and then distributing said multiplexed digital data by inverse multiplexing in synchronism with a predetermined system clock on said data transfer line to send out to said data transfer line;

a plurality of interfaces connected to a plurality of external devices in one-by-one correspondence, and constructed so as to fit to transmission speeds peculiar to said plurality of external devices respectively;

a plurality of frequency modulators connected to said plurality of interfaces in one-by-one correspondence, for executing a frequency modulation to synchronize said digital data which have natural transmission speeds on respective interfaces with a predetermined system clock on said data transfer line, and then sending out said digital data which are subjected to said frequency modulation to said data transfer line respectively;

a plurality of frequency demodulators for receiving said digital data output from said distributor via said data transfer line, then executing a frequency demodulation to synchronize input digital data which have been synchronized with said predetermined system clock on said data transfer line with said natural transmission speeds on said plurality of interfaces respectively, and then sending out said digital data which are subjected to said frequency demodulation to said plurality of interfaces respectively;

a multiplexer for multiplexing said digital data which are transmitted from said plurality of frequency modulators via said data transfer line in synchronism with said predetermined system clock, and then transmitting multiplexed digital data to an external network; and a clock generator for generating reference clocks including said predetermined system clock, and then supplying said generated reference clocks to said distributor, said multiplexer, said plurality of frequency modulators, and said plurality of frequency demodulators respectively.

4. A communication method for use in a communication system including, a data transfer line for transferring digital data, and a plurality of interfaces connected to a plurality of external devices in one-by-one correspondence, and constructed so as to fit to transmission speeds peculiar to said plurality of external devices respectively, said communication method comprising the steps of:

executing a frequency modulation to synchronize said digital data which are output from said plurality of external devices having natural transmission speeds on said plurality of interfaces respectively with a predetermined system clock on said data transfer line, and then sending out said digital data which are subjected to said frequency modulation to said data transfer line respectively; and multiplexing said digital data which are input via said data transfer line respectively in synchronism with said predetermined system clock, and then transmitting multiplexed digital data to an external network;

whereby said digital data transmitted from said plurality of external devices respectively are sent to said external network via said data transfer line, and receiving multiplexed digital data transmitted from said external network, and then distributing said multiplexed digital data by inverse multiplexing in synchronism with said predetermined system clock to send out to said data transfer line;

receiving said digital data transmitted via said data transfer line respectively, and then executing a frequency demodulation to synchronize said digital data which have been synchronized with said predetermined system clock with said natural transmission speeds on said plurality of interfaces respectively; and receiving said digital data which are subjected to said frequency demodulation by said plurality of external devices via said plurality of interfaces respectively;

whereby said multiplexed digital data transmitted from said external network are received by said plurality of external devices via said data transfer line respectively.

5. A communication method according to claim 4, wherein said digital data input via said data transfer line respectively are transformed into plural packets and then transmitted to said external network on a time-division multiplex basis.

6. A transmitter according to claim 1, further comprising a plurality of information adding means for adding header information including at least destination to said digital data which are divided into a predetermined proper unit with respect to said plurality of interfaces and then output.

7. A receiver according to claim 2, further comprising a plurality of header information deleting means for deleting header information from said digital data to which said header information including at least destination are added and which are sent out from said distributor via said data transfer line.

8. A communication apparatus according to claim 3, further comprising:

a plurality of information adding means for adding header information including at least destination to said digital data which are divided into a predetermined proper unit with respect to said plurality of interfaces and then output; and a plurality of header information deleting means for deleting said header information from said digital data to which said header information including at least destination are added and which are sent out from said distributor via said data transfer line.

9. A communication apparatus according to claim 3, wherein data exchanges are executed between senders and destinations based on device reference clocks peculiar to said plurality of external devices which are distributed at predetermined distribution ratios of said predetermined system clock.

10. A transmitter comprising:

a data transfer line for transferring digital data;

a plurality of interfaces connected to a plurality of external devices in one-by-one correspondence, and constructed so as to fit to transmission speeds peculiar to said plurality of external devices respectively;

a plurality of frequency modulators connected to said plurality of external interfaces in one-by-one correspondence, for executing a frequency modulation to synchronize said digital data which have natural transmission speeds on respective interfaces with a predetermined system clock of multiplexer side, and then sending out said digital data which are subjected to said frequency modulation to said data transfer line respectively;

a multiplexer for multiplexing said digital data which are transmitted from said plurality of frequency modulators via said data transfer line in synchronism with said predetermined system clock of multiplexer side, and then transmitting multiplexed digital data to an external network; and a clock generator for generating reference clocks including said predetermined system clock and then supplying said generated reference clocks to said plurality of frequency modulators and said multiplexer respectively.

11. A receiver comprising:

a data transfer line for transferring digital data;

a distributor for receiving multiplexed digital data transmitted from an external network, and then distributing said multiplexed digital data by inverse multiplexing in synchronism with a predetermined system clock of distributor side in said data transfer line to send out to said data transfer line;

a plurality of interfaces connected to a plurality of external devices in one-by-one correspondence, and constructed so as to fit to transmission speeds peculiar to said plurality of external devices respectively;

a plurality of frequency demodulators for receiving said digital data output from said distributor via said data transfer line, then executing a frequency demodulation to synchronize said digital data which have been synchronized with said predetermined system clock of distributor side with said natural transmission speeds on said plurality of interfaces respectively, and then sending out said digital data which are subjected to said frequency demodulation to said plurality of interfaces respectively; and a clock generator for generating reference clocks including said predetermined system clock of distributor side, and then supplying said reference clocks to said distributor and said plurality of frequency demodulators respectively.

12. A communication apparatus comprising:

a data transfer line for transferring digital data;

a distributor for receiving multiplexed data transmitted from an external network, and then distributing multiplexed digital data by inverse multiplexing in synchronism with a predetermined system clock of distributor side to send out to said data transfer line;

a plurality of interfaces connected to a plurality of external devices in one-by-one correspondence, and constructed so as to fit to transmission speeds peculiar to said plurality of external devices respectively;

a plurality of frequency modulators connected to said plurality of interfaces in one-by-one correspondence, for executing a frequency modulation to synchronize said digital data which have natural transmission speeds on respective interfaces with a predetermined system clock of multiplexer side, and then sending out said digital data which are subjected to said frequency modulation to said data transfer line respectively;

a plurality of frequency demodulators for receiving said digital data which are output from said distributor via said data transfer line, then executing a frequency demodulation to synchronize said digital data which have been synchronized with said predetermined system clock of distributor side with said natural transmission speeds on said plurality of interfaces respectively, and then sending out said digital data which are subjected to said frequency demodulation to said plurality of interfaces respectively;

a multiplexer for multiplexing said digital data which are transmitted from said plurality of frequency modulators via said data transfer line in synchronism with said predetermined system clock of multiplexer side, and then transmitting multiplexed digital data to an external network; and a clock generator for generating reference clocks including said predetermined system clock of distributor side and said predetermined system clock of multiplexer side, and then supplying said reference clocks to said distributor, said multiplexer, said plurality of frequency modulators, and said plurality of frequency demodulators respectively.

13. A communication method for use in a communication system including, a data transfer line for transferring digital data, and a plurality of interfaces connected to a plurality of external devices in one-by-one correspondence, and constructed so as to fit to transmission speeds peculiar to said plurality of external devices respectively, said communication method comprising the steps of:

executing a frequency modulation to synchronize said digital data which are output from said plurality of external devices having said natural transmission speeds on said plurality of interfaces respectively with a predetermined system clock of multiplexer side, and then sending out said digital data which are subjected to said frequency modulation to said data transfer line respectively; and multiplexing said digital data which are input via said data transfer line respectively in synchronism with said predetermined system clock of multiplexer side, and then transmitting multiplexed digital data to an external network;

whereby said digital data which are transmitted from said plurality of external devices respectively are sent to said external network via said data transfer line, and receiving said multiplexed digital data transmitted from said external network, and then distributing said multiplexed digital data by inverse multiplexing in synchronism with said predetermined system clock of distributor side to send out to said data transfer line;

receiving said digital data transmitted via said data transfer line respectively, and then executing a frequency demodulation to synchronize said digital data which have been synchronized with said predetermined system clock of distributor side with said natural transmission speeds on said plurality of interfaces respectively; and receiving said digital data which are subjected to said frequency demodulation by said plurality of external devices via said plurality of interfaces respectively;

whereby said multiplexed digital data which are transmitted from said external network are received by said plurality of external devices via said data transfer line respectively.

14. A communication method according to claim 13, wherein said digital data which are input via said data transfer line respectively are transformed into plural packets and then transmitted to said external network on a time-division multiplex basis.

15. A communication apparatus according to claim 12, wherein data exchanges are executed between senders and destinations based on device reference clocks peculiar to said plurality of external devices which are distributed at predetermined distribution ratios of said predetermined system clock.

16. A communication apparatus according to claim 12, wherein said multiplexer side system clock and said distributor side system clock are set mutually at a common frequency.

17. A communication method according to claim 13, wherein said multiplexer side system clock and said distributor side system clock are set mutually at a common frequency.

18. A transmitter according to claim 10, further comprising a plurality of information adding means for adding header information including at least destination to said digital data which are divided into a predetermined proper unit with respect to said plurality of interfaces and then output.

19. A receiver according to claim 11, further comprising a plurality of header information deleting means for deleting header information from said digital data to which said header information including at least destination are added and which are sent out from said distributor via said data transfer line.

20. A communication apparatus according to claim 12, further comprising:

a plurality of information adding means for adding header information including at least destination to said digital data which are divided into a predetermined proper unit with respect to said plurality of interfaces and then output; and a plurality of header information deleting means for deleting said header information from said digital data to which said header information including at least said destination are added and which are sent out from said distributor via said data transfer line.

21. A communication method for use in a communication system including, a data transfer line for transferring digital data, and a plurality of interfaces connected to a plurality of external devices in one-by-one correspondence, and constructed so as to fit to transmission speeds peculiar to said plurality of external devices respectively, said communication method comprising the steps of:

adding header information including at least destination to said digital data which have natural communication speeds on said plurality of interfaces and are divided into a predetermined proper unit of said plurality of interfaces and then output;

executing a frequency modulation to synchronize said digital data to which said header information are added with a predetermined system clock of multiplexer side, and then sending out said digital data which are subjected to said frequency modulation to said data transfer line respectively; and multiplexing said digital data which are input via said data transfer line respectively in synchronism with said predetermined system clock of multiplexer side, and then transmitting multiplexed digital data to an external network;

whereby said digital data which are transmitted from said plurality of external devices respectively are sent to said external network via said data transfer line, and receiving said multiplexed digital data transmitted from said external network, and then distributing said multiplexed digital data by inverse multiplexing in synchronism with a predetermined system clock of distributor side to send out to said data transfer line;

receiving said digital data which are transmitted via said data transfer line respectively, and then executing a frequency demodulation to synchronize said digital data which have been synchronized with said predetermined system clock of distributor side with said natural transmission speeds on said plurality of interfaces respectively; and receiving said digital data which are subjected to said frequency demodulation by said plurality of external devices via said plurality of interfaces respectively;

whereby said multiplexed digital data which are transmitted from said external network are received by said plurality of external devices via said data transfer line respectively.

22. A communication method for use in a communication system including, a data transfer line for transferring digital data, and a plurality of interfaces connected to a plurality of external devices in one-by-one correspondence, and constructed so as to fit to transmission speeds peculiar to said plurality of external devices respectively, said communication method comprising the steps of:

executing a frequency modulation to synchronize said digital data which have natural communication speeds on said plurality of interfaces with a predetermined system clock of multiplexer side;

adding header information including at least destination to said digital data which are subjected to said frequency modulation and are divided into a predetermined proper unit of said plurality of interfaces and then output respectively, and then sending out said digital data to which said header information are added to said data transfer line respectively; and multiplexing said digital data which are input via said data transfer line respectively in synchronism with said predetermined system clock of multiplexer side, and then transmitting multiplexed digital data to an external network;

whereby said digital data which are transmitted from said plurality of external devices respectively are sent to said external network via said data transfer line, and receiving said multiplexed digital data transmitted from said external network, and then distributing said multiplexed digital data by inverse multiplexing in synchronism with a predetermined system clock of distributor side to send out to said data transfer line;

receiving said digital data which are transmitted via said data transfer line respectively, and then executing a frequency demodulation to synchronize said digital data which have been synchronized with said predetermined system clock of distributor side with said natural transmission speeds on said plurality of interfaces respectively; and receiving said digital data which are subjected to said frequency demodulation by said plurality of external devices via said plurality of interfaces respectively;

whereby said multiplexed digital data which are transmitted from said external network are received by said plurality of external devices via said data transfer line respectively.

* * * * *

UNITED STATES PATENT AND TRADEMARK OFFICE
CERTIFICATE OF CORRECTION

PATENT NO. : 6,167,061

DATED : December 26, 2000

INVENTOR(S) : Yoshinori Nakatsugawa

It is certified that error appears in the above-identified patent and that said Letters Patent is hereby corrected as shown below:

Column 3, line 50, change "insynchronism" to --in synchronism--.
Column 27, line 45, change "1A" to --10A--;
       line 60, change "1A" to --11A--.

Signed and Sealed this

Eighth Day of May, 2001

Attest:

NICHOLAS P. GODICI

*Attesting Officer*    *Acting Director of the United States Patent and Trademark Office*